United States Patent
Lim et al.

(10) Patent No.: US 12,069,268 B2
(45) Date of Patent: Aug. 20, 2024

(54) VIDEO DECODER, VIDEO ENCODER, METHODS FOR ENCODING AND DECODING VIDEO SIGNALS AND COMPUTER PROGRAM ADJUSTING ONE OR MORE DENOISING OPERATIONS

(71) Applicant: Fraunhofer-Gesellschaft zur Förderung der angewandten Forschung e.V., Munich (DE)

(72) Inventors: Wang-Q Lim, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 155 days.

(21) Appl. No.: 17/560,781

(22) Filed: Dec. 23, 2021

(65) Prior Publication Data
US 2022/0116618 A1    Apr. 14, 2022

Related U.S. Application Data

(63) Continuation of application No. PCT/EP2020/068163, filed on Jun. 26, 2020.

(30) Foreign Application Priority Data

Jun. 28, 2019  (EP) .................. 19183364
Dec. 23, 2019  (EP) .................. 19219562

(51) Int. Cl.
*H04N 19/00*    (2014.01)
*H04N 19/117*    (2014.01)
(Continued)

(52) U.S. Cl.
CPC ......... *H04N 19/132* (2014.11); *H04N 19/117* (2014.11); *H04N 19/172* (2014.11);
(Continued)

(58) Field of Classification Search
CPC .. H04N 19/132; H04N 19/117; H04N 19/172; H04N 19/1883; H04N 19/80;
(Continued)

(56) References Cited

U.S. PATENT DOCUMENTS 9,204,171 B1    12/2015 Lee et al.
10,778,973 B2 *   9/2020 Sze .................. H04N 19/132
(Continued)

FOREIGN PATENT DOCUMENTS

CN    103051890 A    4/2013
CN    103248888 A    8/2013
(Continued)

OTHER PUBLICATIONS

Peter List et al, "Adaptive deblocking filter", IEEE Transactions on Circuits and Systems for Video Technology, vol. 13, No. 7, Jul. 2003.
(Continued)

*Primary Examiner* — Frank F Huang
(74) *Attorney, Agent, or Firm* — NKL LAW; Jae Youn Kim

(57) ABSTRACT

A video decoder and a video encoder include a noise reduction operation including at least two denoising operations and adapting the second denoising operation in dependence of the difference before and after the first denoising operation, thus correcting the quality reduction occurred due to the application of the first denoising operation. Corresponding methods serve to encode and decode video signals.

77 Claims, 10 Drawing Sheets

(51) Int. Cl.
 *H04N 19/132* (2014.01)
 *H04N 19/169* (2014.01)
 *H04N 19/172* (2014.01)
 *H04N 19/80* (2014.01)
 *H04N 19/85* (2014.01)

(52) U.S. Cl.
 CPC ......... *H04N 19/1883* (2014.11); *H04N 19/80* (2014.11); *H04N 19/85* (2014.11)

(58) Field of Classification Search
 CPC ...... H04N 19/85; H04N 19/182; H04N 19/86; H04N 19/82; H04N 19/42; H04N 19/44; H04N 19/51; H04N 19/91; H04N 19/96
 See application file for complete search history.

(56) References Cited

U.S. PATENT DOCUMENTS

| | | | | |
|---|---|---|---|---|
| 10,819,988 | B2* | 10/2020 | Kawamura | H04N 19/159 |
| 10,869,060 | B2* | 12/2020 | Han | H04N 19/129 |
| 10,887,604 | B2* | 1/2021 | Karczewicz | H04N 19/117 |
| 11,115,652 | B2* | 9/2021 | Zhao | H04N 19/105 |
| 11,140,418 | B2* | 10/2021 | Karczewicz | H04N 19/117 |
| 11,190,778 | B2* | 11/2021 | An | H04N 19/117 |
| 11,228,757 | B2* | 1/2022 | Bordes | H04N 19/147 |
| 11,375,217 | B2* | 6/2022 | Xu | H04N 19/80 |
| 11,375,219 | B2* | 6/2022 | Du | H04N 19/132 |
| 11,438,587 | B2* | 9/2022 | Leleannec | H04N 19/119 |
| 2006/0153301 | A1 | 7/2006 | Guleryuz | |
| 2007/0076803 | A1 | 4/2007 | Osamoto et al. | |
| 2008/0152247 | A1 | 6/2008 | Oh et al. | |
| 2013/0051454 | A1 | 2/2013 | Sze et al. | |
| 2013/0077697 | A1 | 3/2013 | Chen et al. | |
| 2013/0251032 | A1* | 9/2013 | Tanaka | H04N 19/463 375/240.03 |
| 2013/0259118 | A1* | 10/2013 | Fu | H04N 19/169 375/240.02 |
| 2013/0266058 | A1* | 10/2013 | Minoo | H04N 19/13 375/240.02 |
| 2013/0329784 | A1* | 12/2013 | Chuang | H04N 19/176 375/240.02 |
| 2019/0116359 | A1 | 4/2019 | Dong et al. | |

FOREIGN PATENT DOCUMENTS

| | | |
|---|---|---|
| EP | 3177014 A1 | 6/2017 |
| WO | 2012/121280 A1 | 9/2012 |
| WO | 2016/017937 A1 | 2/2016 |

OTHER PUBLICATIONS

Chih-Ming Fu et al., "Sample adaptive offset in the HEVC standard", IEEE Transactions on Circuits and Systems for Video Technology, vol. 22, No. 12, Dec. 2012.

Marta Karczewicz et al.,"Geometry Transformation-based Adaptive In-Loop Filter", in Picture Coding Symposium (PCS), Nuremberg, Germany, 2016.

Bross, B. et al., "Versatile Video Coding (Draft 4)", Joint Video Experts Team (JVET) of ITU-T SG 16 WP 3 and ISO/IEC JTC 1/SC 29/WG 11, JVET-M1001-v7, 13th Meeting, Marrakech, Marocco, Jan. 2019.

* cited by examiner 4-neighbourhood	8-neighbourhood

VIDEO DECODER, VIDEO ENCODER, METHODS FOR ENCODING AND DECODING VIDEO SIGNALS AND COMPUTER PROGRAM ADJUSTING ONE OR MORE DENOISING OPERATIONS

CROSS-REFERENCES TO RELATED APPLICATIONS

This application is a continuation of copending International Application No. PCT/EP2020/068163, filed Jun. 26, 2020, which is incorporated herein by reference in its entirety, and additionally claims priority from European Applications Nos. EP 19183364.9, filed Jun. 28, 2019, and EP 19219562.6, filed Dec. 23, 2019, both of which are incorporated herein by reference in their entirety.

The present application is concerned with decoding and encoding video signal, particularly using adjusting one or more denoising operations.

Embodiments according to the invention are related to a video decoder.

Further embodiments according to the invention are related to a video encoder.

Further embodiments according to the invention are related to a method for providing a decoded video information on the basis of an encoded video information.

Further embodiments according to the invention are related to a method for providing an encoded video information on the basis of an input video information.

Further embodiments according to the invention are related to a computer program for performing methods for encoding and decoding video signals.

Further embodiments according to the invention are related to an encoded video representation representing a video content.

BACKGROUND OF THE INVENTION

A multitude of devices and methods for decoding and encoding of video signals are currently known. Multiple different filtering techniques are known to be used in order to improve a compression performance and a visual quality of the decompressed videos.

In video coding, the in-loop filter has emerged as a key module due to its significant improvement on compression performance. For example, in P. List, A. Joch, J. Lainema, G. Bjontegaard, and M. Karczewicz, *Adaptive deblocking filter*, IEEE Trans. Circuits Syst. Video Technol. 13 (2003), No. 7, the in-loop filter adopted into video coding standards is a deblocking filter (DBF) which is used to mainly reduce blocking artifacts. However, although the deblocking filter (DBF) effectively removes blocking artifacts at smooth regions it at the same time removes sharpness of pictures at complex regions. Besides, the subjective quality of reconstructed pictures is reduced due to highlighting corner outlines as a result of application of the DBF.

Another nonlinear in-loop filter, a sample adaptive offset (SAO) filter, is used in high efficiency video coding (HEVC), as shown for example in C.-M. Fu et al., *Sample adaptive offset in the HEVC standard*, IEEE Trans. Circuits Syst. Video Technol. 22 (2012) No. 12, to further reduce the coding artifacts after DBF. However, the visual quality is still lost, especially in case of high resolution videos. Besides, additional filtering components may cause an increase in the encoding latency. Therefore, further improvements of such filtering techniques are important, especially for high resolution videos.

In view of the above, there is a desire to create a video coding concept which provides an improved tradeoff between a compression performance and a visual quality and a low encoding latency, which leads to an improved coding efficiency.

SUMMARY

An embodiment may have a video decoder for providing a decoded video information $VI_{de}$ on the basis of an encoded video information $VI_{en}$,
wherein the video decoder is configured to obtain first sample information $I_{s1}$ on the basis of the encoded video information $VI_{en}$;
wherein the video decoder is configured to apply a first denoising operation, in order to obtain a first denoised sample information $I_{ds1}$ on the basis of the first sample information $I_{s1}$;
wherein the video decoder is configured to apply a second denoising operation on the basis of a result of the first denoising operation;
wherein the video decoder is configured to adjust the second denoising operation in dependence on differences between samples before the first denoising operation and after the first denoising operation, in order to obtain the decoded video information $VI_{de}$.

Another embodiment may have a video encoder for providing an encoded video information $VI_{en}$ on the basis of an input video information VI,
wherein the video encoder is configured to obtain first sample information $I_{s1}$, which considers a transform into a spectral domain, a quantization of transform coefficients and a prediction, on the basis of the input video information VI.

According to yet another embodiment, a method for providing a decoded video information on the basis of an encoded video information may have the steps of: obtaining first sample information on the basis of the encoded video information; applying a first denoising operation, in order to obtain a first denoised sample information on the basis of the first sample information; applying a second denoising operation on the basis of a result of the first denoising operation; adjusting the second denoising operation in dependence on differences between samples before the first denoising operation and after the first denoising operation, in order to obtain the decoded video information.

According to still another embodiment, a method for providing an encoded video information on the basis of an input video information may have the steps of: obtaining first sample information, which considers a transform into a spectral domain, a quantization of transform coefficients and a prediction, on the basis of the input video information, applying a first denoising operation, in order to acquire a first denoised sample information on the basis of the first sample information; determining parameters of a second denoising operation on the basis of a result of the first denoising operation; adjusting the second denoising operation in dependence on differences between samples before the first denoising operation and after the first denoising operation, in order to acquire the decoded video information.

According to another embodiment, a non-transitory digital storage medium may have a computer program stored thereon to perform the inventive methods, when said computer program is run by a computer.

According to yet another embodiment, an encoded video representation representing a video content may have: an encoded representation of transform coefficients; and a plurality of offset values associated with a second denoising operation, which are associated with a plurality of classes of samples in dependence on a difference between samples before a first denoising operation and after the first denoising operation.

An embodiment according to the invention creates a video decoder for providing a decoded video information on the basis of an encoded video information, for example an encoded video input, or a video input. The video decoder is configured to obtain a first sample information, e.g. a noisy first sample information, on the basis of the encoded video information, for example using an entropy decoding of a bitstream, an inverse quantization and an inverse transformation, and optionally using a prediction. The first sample information may include, for example, values of a YUV image representation, such as pixel values, e.g. y1. The video decoder is also configured to apply a first denoising operation, e.g. a noise reduction operation, for example a combination of DBF, or a deblocking filter (DBF) operation, SAO, or a sample adaptive offset (SAO) filter operation, ALF, or an adaptive loop filter (ALF) operation, or a combination of DBF, or the DBF operation, and SAO, or the SAO operation, or one of said denoising operations, or a combination of DBFV, or a deblocking filter for vertical edges (DBFV) operation, and DBFH, or a deblocking filter for horizontal edges (DBFH) operation, or, for example only, DBFV, or the DBFV operation, in order to obtain a first denoised sample information on the basis of the first sample information. The first denoised sample information is, for example, an output of SAO, or the SAO operation, or an output of ALF, or the ALF operation, or an output of a combination of DBFV and DBFH, or the DBFV and DBFH operations, or an output of DBFV, or the DBFV operation, e.g. y2. The deblocking filter (DBF) consists, for example, of one or two filtering operations, namely the deblocking filter for vertical edges (DBFV) or/and the deblocking filter for horizontal edges (DBFH), which means, for example, DBF=DBFV or DBFH or DBFV+DBFH, and the deblocking filter can, for example, be a conventional deblocking filter. The video decoder is further configured to apply a second denoising operation, for example PSAO, or a post sample adaptive offset (PSAO) filter operation, or SAO, or the SAO filter operation, or SAOV, or the SAO filter for vertical edges (SAOV) operation, on the basis of a result of the first denoising operation, for example on the basis of the first denoised sample information, or, for example, on the basis of the output of SAO, or the SAO operation or ALF, or the ALF operation, or, for example, on the basis of the output Y of a combination of DBFV and DBFH, or the DBFV and DBFH operations, or, for example, on the basis of the output Y2 of DBFV, or the DBFV operation. The video decoder is configured to adjust, e.g. adapt, the second denoising operation, for example SAO, or the SAO operation, or SAOV, or the SAOV operation in dependence on differences, e.g. y2(i)−y1(i) or Y−Y1 or Y2−Y1, between samples before the first denoising operation, being for example a combination of DBFV and DBFH, or the DBFV operation and the DBFH operation, and after the first denoising operation, being for example a combination of DBFV and DBFH, or, the DBFV operation and the DBFH operation, or DBFV, or the DBFV operation, in order to obtain the decoded video information. The SAOV and a SAOH (the SAO filter for horizontal edges) may, for example, include classifications for SAOV, or the SAOV operation and SAOH, or the SAOH operation, which are based, for example, on $Y_2-Y1$ or $Y-Y1$, e.g. a difference between the output of DBFV, or the DBFV operation and samples before DBFV, or the DBFV operation, or a difference between samples before DBFH, or the DBFH operation and after DBFH, or the DBFH operation, or $Y_3-\tilde{Y}_2$, e.g. a difference between the output of DBFH, or the DBFH operation and the output of SAOV, or the SAOV operation, respectively.

This embodiment is based on the finding that adapting the second denoising operation in dependence of the difference before and after the first denoising operation can correct the quality reduction occurred due to the application of the first denoising operation. Thus, an effective noise filtering with maintained video quality is provided by the embodiment. For example, the difference between samples before the first denoising operation and after the second denoising operation indicates in which areas the first denoising operation has a particularly large impact, and it is therefore possible to consider a knowledge, in which areas the first denoising operation has a particularly large impact when performing the subsequent second denoising operation. For example, one or more parameters of the second denoising operation may be adjusted (e.g. in a locally variable manner) in dependence on a (local) difference between samples (or corresponding samples) before the first denoising operation and after the first denoising operation. Worded differently, local variations of said difference may be used to locally adapt the second denoising operation. For example, it may be considered that a first type of second denoising operation—or a first parameter or parameter set of the second denoising operation—may provide a best result (and should therefore be applied) in regions in which said difference is comparably small, while a second type of second denoising operation—or a second parameter or parameter set of the second denoising operation—may provide a best result (and should therefore be used) in regions in which said difference is comparably larger.

Thus, it has been found that it is advantageous to adapt characteristics of the second denoising operation in dependence on said difference, since said difference describes, for example, how strongly the first denoising operation has affected the (first) sample information (e.g. in different areas of an image), and since a corresponding (possibly locally varying) adaptation of the second denoising operation brings along good image quality while keeping a latency and a computational effort reasonably small.

In accordance with an embodiment, the second denoising operation is configured to classify samples, for example pixels, e.g. y(i), wherein y may be a decoded input image for the PSAO operation, e.g. having sample indices i, into a plurality of classes, such as groups, lambda_1 or $\Lambda_1$, lambda_2 or $\Lambda_2$, lambda_0 or $\Lambda_0$, of samples, in dependence on the difference, e.g. y2(i)−y1(i), between samples before the first denoising operation, e.g. y1(i), and after the first denoising operation, e.g. y2(i). The second denoising operation is configured to modify samples in dependence on the classification. The classification is based, for example, on a difference between a noisy (unfiltered) signal and a denoised (filtered) signal.

This embodiment is based on the finding that the filtering performance essentially relies on how the samples's classification behaves. Performing a successful classification of the samples in accordance with the difference between the noisy signal and the denoised signal and using this classification to modify samples in the second denoising operation minimizes errors in the samples occurred during the filtering in the first denoising operation. Besides, based on the conventional classification the samples' modification in the second denoising operation may be performed faster, thus decreasing encoding latency.

The second denoising operation accordingly can be considered a sample adaptive offset operation, for example SAO, or the SAO operation, SAOV, or the SAOV operation, SAOH, or the SAOH (4th) operation, subsequent to one or a combination of DBF, or the DBF operation, DBFV, or the DBFV operation, DBFV and SAOV, or the DBFV and SAOV operations, SAOV and DBFH, or the SAOV and DBFH operations, DBFV and SAOV or DBFV, or the DBFV and SAOV or DBFV operations, DBFV and SAOV and DBFV, or the DBFV and SAOV and DBFV operations, or a combination of DBFV and DVFH, or the DBFV and DBFH operations, which are connectable in series and can be executed successively. Different combinations of the filtering operations may further decrease encoding latency and may provide additional coding gains or quality enhancements.

As a remark, it should be noted that in some embodiments 'Samples' are presented as, for example, y(i) and y, which is a decoded input image for PSAO (or for the PSAO operation).

According to an embodiment, y, which is, for example, an input image, e.g. an input image of PSAO, or the PSAO operation, and y2, which is, for example, a first denoised image, are given as an output of ALF, or the ALF operation, e.g. y, and an output of SAO, or the SAO operation, e.g. y2, respectively. In this case, y and y2 are different.

According to another embodiment, when y2 is chosen to be an output of ALF, or the ALF operation, the input image y, e.g. of PSAO, or the PSAO operation, and y2 are the same images.

According to some embodiments, the input image y, e.g. the input image of PSAO, or the PSAO operation, should typically be an output of ALF, or the ALF operation since PSAO, or the PSAO operation is, for example, applied after an in-loop filtering process, such as a combination of DBF+SAO+ALF, or the DBF operation+the SAO operation+the ALF operation. All the mentioned embodiments provide an improved visual quality of the decoded video and/or an improved tradeoff between bitrate, complexity and video quality.

According to an embodiment, the second denoising operation is configured to conditionally add an offset to a plurality of samples in dependence on a classification of the respective samples. The offset is, for example, selected for each group of sample values or sample locations, sharing a same class index. Efficient removing of coding artefacts is provided in this embodiment.

According to an embodiment, the first denoising operation comprises a deblocking filter operation, which, for example, removes artifacts along block boundaries, e.g. using a low pass filtering of pixel values along block boundaries, and/or a sample adaptive offset filter operation. Different codings artefacts may be effectively removed in such an embodiment.

According to an embodiment, the sample adaptive offset filtering is configured to classify samples of an image into a plurality of classes in dependence on one or more edge patterns, e.g. along one or more directions, in the image in an environment of a sample under consideration, e.g. comprising the sample under consideration, and/or in dependence on a sample value of the sample under consideration. The samples can be, for example, pixels, e.g. y(i), wherein y may be a decoded input image for SAO, or the SAO operation; e.g. having sample indices i.

This embodiment is based on the finding that an effective partition of the set of all sample locations improves the filtering performance for each location. For example, a different impact of different edge patterns onto pixel values may be considered (and, for example, at least partially compensated) in this manner (wherein, for example, an error of pixel values may depend on the presence of one or more edges in an environment of the pixel under consideration). Moreover, a dependence of a pixel value error from the actual pixel value may, for example, be considered (and, for example, at least partially compensated) in this manner.

As a remark, it should be noted that a conventional SAO, or SAO operation may, for example, apply a classification, for example, based on the following two features (or at least one of said features):

1) Each sample is assigned to one of, for example, 5 classes based on 1-D directional edge patterns, for example, along 4 directions, like, for example, horizontal, vertical, 135° diagonal and 45° diagonal.

2) Each sample is classified based on a sample value range, for example, equally divided into, for example, 32 bands.

For example, the conventional SAO, or SAO operation is applied for each Coding Tree Unit (CTU) (or for a plurality of coding tree units) with a classification selected among, for example, 5 different classifications as explained above—for example, 4 classifications based on the edge information (horizontal+vertical+two diagonals)+for example, a classification based on the sample value range which simply checks the sample value itself to assign it to one of, for example, 32 bands.

According to an embodiment (or according to an aspect of the invention), the proposed classification is based on a different feature, namely a difference between a noisy (unfiltered) signal and a denoised (filtered) signal, for example, when compared to a classification used in SAO, or the SAO operation, which is, for example, based on an evaluation of samples of a single image or frame or CTU. This embodiment is based on the finding that considering a difference between the unfiltered and filtered signals allows a correction of quality errors occurred during the filtering operation.

According to an embodiment, a first denoising operation (or the first denoising operation mentioned above) comprises ALF, or an adaptive loop filter (ALF) operation which performs a filtering, for example a linear filtering, e.g. a finite-impulse response filtering or an infinite impulse response filtering, for example of pixel values, using an impulse response, coefficients of which are encoded in the bitstream. This embodiment is based on the finding that different types of the adaptive loop filtering (ALF) increase coding gains. Also, such a filter, coefficients of which are encoded in the bitstream, can be adapted to a specific video content and therefore provide a good compromise between bitrate and quality (for example, when compared to a case in which the full bit budget is spent onto an encoding of pixel values).

According to an embodiment, the video decoder is configured to apply the second denoising operation to a sample information, for example to an image, or for example to pixel values, or for example to YUV values of a YUV video representation, or for example to y(i), which is obtained using a combination, e.g. a sequence, of one or more deblocking filter operations, for example DBF, or the DBF operation, DBFH, or the DBFH operation and/or DBFV, or the DBFV operation, one or more sample-adaptive offset filtering operations, for example SAO, or the SAO operation, or SAOH, or the SAOH operation and/or SAOV, or the SAOV operation, and an adaptive loop filter operation, ALF, or for example the ALF operation. This embodiment is based on the finding that a usage of a plurality of different processing steps as the first denoising operation allows for a good initial denoising. Also, it has been found that a total change of a pixel value by such a sequence of different processing steps (which is represented by the difference between samples before the first denoising operation and samples after the first denoising operation) constitutes a reliable criterion for adapting the (subsequent) second denoising operation.

According to an embodiment, the second denoising operation is configured to be applied to a number of Coding Tree Units (CTU)s which define a video frame, for example a picture as a whole. Alternatively or complementarily, the second denoising operation could be configured to be applied to a video frame, for example a picture as a whole, consisting of Coding Tree Units (which may, for example, define the video frame).

For example, the CTU may be the basic processing unit, and the CTUs can use larger block structures of, for example, up to 64×64 pixels and can better sub-partition the picture into variable sized structures. High Efficiency Video Coding (HEVC) uses, for example, CTUs up to 64×64 only. However larger CTU such as, for example, 128×128 can be used in quadtree plus binary tree (QTBT) setting adopted to a preliminary draft of a new video coding standard. This embodiment is based on the finding that a block based classification may reduce a complexity of filtering process.

According to an embodiment, the classification of the samples into a plurality of classes only occurs when one or more predetermined threshold values is reached. The one or more predetermined threshold values could be, for example, a single threshold value T, which can be chosen as a fixed positive constant, e.g. dependent on a human visual perception, or more T0 ... TL (e.g. more threshold value T0 to TL, or for example a set of thresold values T0 to TL) in case of a higher differentiation, or for example a single threshold value T, which can be, for example, encoded at an encoder or chosen as a fixed positive constant, e.g. the threshold T can be determined based on a rate distortion (RD) cost at the encoder. Accordingly, for example, unnecessary filtering operations are thus excluded, which decreases the encoding latency and decreases a consumption of operational resources.

According to an embodiment, the second denoising operation is configured to classify samples, for example a currently considered sample, into three or more classes in dependence on whether a difference between corresponding samples before the first denoising operation, e.g. y1[i], or Y1 or $\tilde{Y}_2$, and after the first denoising operation fulfils a first condition, e.g. y2(i)−y1(i)>T, or a second condition, e.g. y2(i)−y1(i)←−T, or a third condition, e.g. −T<=y2(i)−y1(i) <=T. Alternatively, the second denoising operation is configured to classify samples, for example a currently considered sample, into three or more classes in dependence on whether a combined, e.g. an optionally weighted, difference value, e.g. f(i), which is based on a plurality of differences, e.g. weighted differences, between corresponding samples, for example in a predetermined environment of a currently considered sample, before the first denoising operation and after the first denoising operation, fulfils a first condition, e.g. f(i)>T, or a second condition, e.g. f(i)←−T, or a third condition, e.g. −T<=f(i)<=T. An improved tradeoff between the compression performance and encoding speed is thus provided. Moreover, the classification may be used to adapt the second denoising operation to the effectiveness of the first denoising operation, or to the change of one or more pixel values caused by the first denoising operation.

According to an embodiment, the second denoising operation is configured to classify samples into three or more classes in dependence on a magnitude, or absolute value, of the difference between corresponding samples before the first denoising operation, e.g. y1[i], or e.g. Y1 or $\tilde{Y}_2$, and after the first denoising operation, e. g. y2[i], or e.g. Y2, Y3 or Y, and in dependence on a sign of the difference between corresponding samples before the first denoising operation, e.g. y1[i], or e.g. Y1 or $\tilde{Y}_2$, and after the first denoising operation, e. g. y2[i], Y2, Y3 or Y. A respective sample is allocated, for example, to class 3, lambda0 or $\Lambda_0$, if the absolute value of said difference is smaller than T or equal to T, and the respective sample is allocated, for example, to class 1, lambda1 or $\Lambda_1$, if the absolute value of the difference is larger than T and the sign of the difference, e.g. y2(i)−y1(i), is positive. The respective sample is allocated, for example, to class 2, lambda2 or $\Lambda_2$, if the absolute value of the difference is larger than T and the sign of the difference y2(i)−y1(i) is negative. For example, for more than three classes according to lamda1 or $\Lambda_1, \ldots,$ lamda2L or $\Lambda_{2L}$ wherein more than one threshold is assigned, the respective sample is allocated to one of the more than three classes (e.g. designated by $\Lambda_0$ to $\Lambda_{2L}$) according to $$\Lambda_\ell = \{i \in I : T_{\ell-1} \le (Y_1(i) - Y(i)) < T_\ell\}$$

and $$\Lambda_{\ell+L} = \{i \in I : T_{\ell-1} \le (Y(i) - Y_1(i)) < T_\ell\}$$

for $\ell = 1, \ldots, L$ and $$\Lambda_0 = I \cap (\Lambda_1 \cup \cdots \cup \Lambda_{2L})^c$$

This approach increases an accuracy of the sample allocation into one of the classes and provides a successful partitioning (and/or classification) of the set of all sample locations.

According to an embodiment, the second denoising operation is configured to classify samples into three classes according to $$\Lambda_1 = \{i \in I : (y_2(i) - y_1(i)) > T\}$$

and $$\Lambda_2 = \{i \in I : (y_2(i) - y_1(i)) < -T\}$$

$$\Lambda_0 = I \cap (\Lambda_1 \cup \Lambda_2)^c$$

wherein lambda1 or $\Lambda_1$ is a set of samples, e.g. pixels, associated with a first class, lambda2 or $\Lambda_2$ is a set of samples, e.g. pixels, associated with a second class, lambda0 or $\Lambda_0$ is a set of samples, e.g. pixels, associated with a third class, wherein T is a predetermined value, for example a fixed positive constant or a advantageously positive value encoded in the bitstream representing the encoded video content, wherein I (=capital i) is a basic set of samples, wherein ∩ is a cutting set operator—intersection, wherein ∪ is a merge set operator—union, and wherein $^c$ is a complementary set operator. This new classification provides an improved efficiency of the second denoising operation and allows for an efficient adaptation of the second denoising operation in accordance with the pixel value changes caused by the first denoising operation. For example, the classification allows for a discrete set of pixel value modifications which are performed in the second denoising operation.

According to an embodiment, the second denoising operation is configured to determine a combination, for example a weighted sum, of weighted differences, e.g. f(i), which combines a plurality of differences, e.g. y2(i)−y1(i), between corresponding samples in a predetermined environment of a currently considered sample before the first denoising operation and after the first denoising operation, in order to obtain the combined difference value, e.g. f(i), associated with the currently considered sample, e.g. having sample index i. A difference associated with a currently considered sample may, for example, have a larger weight than a difference associated with a sample neighboring the currently considered sample. An improved accuracy of samples classification is thus provided, and an environment of a currently considered sample may also be taken into account in the classification. Thus, dependencies between adjacent samples may for example be exploited, and the classification may be more "smooth", for example, due to the consideration of a plurality of sample value differences in a single classication step. Accordingly, an introduction of excessive artifacts in the second denoising operation may be avoided.

According to an embodiment, the second denoising operation is configured to determine the combined difference value f(i) according to $$f(i) = \sum_{j \in N(i)} \omega(i-j) \cdot (y_2(j) - y_1(j))$$

wherein j is a sample index, N(i) is a set of, e.g. neighboring, samples or sample locations to be considered for the determination of the combined difference value associated with a sample under consideration having a sample index i, wherein w(i−j) (also designated as w(i,j)) is a set of predetermined weight values, for example non-negative weight values or positive weight values, associated with a plurality of sample locations in the environment of the sample under consideration, wherein y2(j)−y1(j) or $y_2(j)-y_1(j)$ is a difference between corresponding samples, e.g. having sample index j, before the first denoising operation and after the first denoising operation. The weighted average difference f(i) may be optionally used to construct Λ0, . . . , Λ2, or $\Lambda_0, \ldots, \Lambda_2$, for example as described above. According to an embodiment, the second denoising operation is configured to select a quantized offset value, e.g. Q(d1), Q(d2), 0, to each sample i (for example, frame, e.g. each of YUV components, or for example group of sample locations sharing a same class index 1) associated with the classification, in dependence on the classification C. An offset value Q(d1) is added, for example, to a sample under consideration if the sample i under consideration is classified to be in a first class I=1. An offset value Q(d2) is added, for example, to the sample under consideration if the sample i under consideration is classified to be in a second class I=2. The sample under consideration is, for example, left unchanged if the sample i under consideration is classified to be in a third class. Accordingly, the value added to a pixel value or subtracted from a pixel value may, for example, be dependent on the classification. Thus, it is, for example, possible to compensate for a bias of the pixel values which correlates with the difference between pixel values before and after the first denoising operation.

According to an embodiment, the second denoising operation is configured to select the offset value using one or more offset values encoded in the encoded video information, for example using two offset values Q(d1), Q(d2) encoded in a bitstream representing the encoded video information. This embodiment minimizes errors between samples before and after the first denoising operation. Also, the effect of the second denoising operation can be optimized by an appropriate signaling of the offset values in the bitstream, while keeping a bitrate overhead reasonably small since the number of offset values is relatively small and since the offset values may be updated only rarely.

According to an embodiment, the second denoising operation is configured to yield an enhanced sample value ỹ, or, more precisely, ỹ(i) (or ŷ or ŷ(i)), wherein i is an index designating a currently handled sample value, according to $$\hat{y} = \sum_{\ell=0}^{2} \chi \Lambda_\ell \cdot (y + Q(d_\ell))$$

wherein dl (or $d_\ell$) is an offset value corresponding to a class, I (=capital i) or I is a class index, Q is a quantization-function, y, or, more precisely, y(i), is a sample value, e.g. a pixel value, input into the second denoising operation (which may be provided by the first denoising operation or on the basis of a result of the first denoising operation, or which may, for example, be provided by an ALF processing), xΛ_l or $\chi\Lambda_l$ is an indicator function indicating in which class I (or I) a currently considered sample y, or, more precisely, y(i), is classified. The accurate placement of the sample in the class is thus provided, which improves a classification operation.

According to an embodiment, the indicator function $\chi\Lambda_l$, or, more precisely, $\chi\Lambda_l(i)$ is defined by $$\chi\Lambda_\ell(i) = \begin{cases} 1 & i \in \Lambda_\ell \\ 0 & i \notin \Lambda_\ell \end{cases}$$

and $$\Lambda_\ell = \{i \in I : C(i) = \ell\}$$

wherein lambda or $\Lambda_l$ is a class; I is a class index for each sample location i in the basic set of samples I; i is a sample location, or an index designating a sample or a sample location, in the basic set of samples I, C is a classification (for a sample location i), ∈ is member-of-set operator, ∀ is a not-member-of-set operator.

According to an embodiment, the second denoising operation is configured to use a first offset value, e.g. Q(d1), for all samples of a video frame classified into a first class, e.g. lambda1 or $\Lambda_1$. Alternatively or complementarily, the second denoising operation is configured to use a second offset value, e.g. Q(d2), for all samples of a video frame classified into a second class, e.g. lambda1 or $\Lambda_1$ or lambda2 or $\Lambda_2$. Alternatively or complementarily, the second denoising operation is configured to use a third offset value, e.g. d0=0, for all samples of a video frame classified into a third class, e.g. lambda0 or $\Lambda_0$.

According to an embodiment, the video decoder is configured to evaluate a bitstream flag, e.g. FLAG, to decide whether the second denoising operation is performed or not. The video decoder is, for example, configured to selectively perform the second denoising operation in dependence on a bitstream flag activating and deactivating the second denoising operation. The unnecessary filtering operations are thus minimized, which decreases the consumption of the operational resources.

According to an embodiment, the video decoder is configured to apply the second denoising operation independently to different YUV components, for example independently to a Y component and to a U component and to a V component representing a single pixel. This embodiment is based on the finding that an independent denoising of different colour components improves a denoising performance.

According to an embodiment, the second denoising operation is configured to classify samples into a plurality of classes according to:

$$\Lambda_\ell = \{i \in I : T_{\ell-1} \le (Y_1(i) - Y(i)) < T_\ell\}$$

and $$\Lambda_{\ell+L} = \{i \in I : T_{\ell-1} \le (Y(i) - Y_1(i)) < T_\ell\}$$

for $\ell = 1, ..., L$ and $$\Lambda_0 = I \cap (\Lambda_1 \cup \cdots \cup \Lambda_{2L})^c$$

wherein lambda1 or $\Lambda_l$ is a set of samples, e.g. pixels, associated with a class $1, \ldots, 2L$; lambda0 or $\Lambda_0$ is a set of samples, e.g. pixels, associated with a class excluding class(es) $1, \ldots, 2L$; Tl-1 to Tl or $T_{l-1}$ to $T_l$ are predetermined values, e.g. a fixed positive constant or a advantageously positive value encoded in the bitstream representing the encoded video content, I (=capital i) is a basic set of samples, $\cap$ is a cutting set operator—intersection, $\cap$ is a merge set operator—union, c is a complementary set operator. This new classification into multiple classes (e.g. more than three) provides an improved accuracy of the classification and an improved efficiency of detection and correction of errors between samples before and after the first denoising operation.

According to an embodiment, Tl-1 to Tl or $T_{l-1}$ to $T_l$ are symmetrical class boundaries, e.g. symmetrical to zero, for differences, for example differences y2(i)-y1(i) or Y-Y1 or $Y_2-Y_1$ or $Y_3-\hat{Y}_2$, between samples before the first denoising operation, e.g. a combination of DBFV and DBFH or DBFV, or the DBFV and DBFH, or DBFV operations, and after the first denoising operation, e.g. a combination of DBFV and DBFH or DBFV, or the DBFV and DBFH, or DBFV operations, in order to obtain a classification for the individual samples, e.g., pixel positions.

According to an embodiment, the second denoising operation is configured to select (or associate) a quantized offset value, e.g. Q(d1), Q(d2), . . . , Q(d2L), 0, to each sample I (for example, a frame, e.g. each of YUV components, or for example a group of sample locations sharing a same class index I associated with the classification) in dependence on the classification C. When, for example, L=1, an offset value Q(d1) is added to a sample under consideration if the sample under consideration is classified to be in a first class I=1, an offset value Q(d2) is added to the sample under consideration if the sample under consideration is classified to be in a second class I=2, and the sample under consideration is left unchanged if the sample i under consideration is classified to be in a third class I=0. An improved accuracy of placement of the sample in the class is thus provided. Accordingly, the values added to a pixel value or subtracted from a pixel value may, for example, be dependent on the classification. It is, for example, possible to compensate for a bias of the pixel values which correlates with the difference between pixel values before and after the first denoising operation.

According to an embodiment, the second denoising operation is configured to select the offset value using offset values encoded in the encoded video information. For example, the offset value can be selected using two offset values Q(d1) and Q(d2) (when L=1) encoded in a bitstream representing the encoded video information. The number of offsets $Q(d_1), \ldots, Q(d_{2L})$ should typically be even and d0=0. Therefore, the second denoising operation can be applied for a number of CTUs or a frame, whereby the offsets $Q(d_1), \ldots, Q(d_{2L})$ are encoded for each of those CTUs or the frame respectively. This embodiment minimizes errors using offset information communicated in the video bitstream. Accordingly, the effect of the second denoising operation can be optimized by an appropriate signaling of the offset values in the bitstream, while keeping a bitrate overhead at a small level due to a relatively small number of offset values and rare possible update of the offset values.

According to an embodiment, the second denoising operation is configured to yield an enhanced sample value $\hat{Y}$, or, more precisely, $\hat{Y}(i)$ or $\hat{Y}$ or $\hat{Y}(l)$, wherein i is an index designating a currently handled sample value, according to $$\hat{Y} = \sum_{\ell=0}^{2L} \chi \Lambda_\ell \cdot (Y + Q(d_\ell))$$

wherein dl is an offset value corresponding to a class, or I is a class index, Q is a quantization-function, Y, or, more precisely, Y(i), is a sample value, e.g. a pixel value, input into the second denoising operation, which may be provided by the first denoising operation or on the basis of a result of the first denoising operation, or which may, for example, be provided by an ALF processing, wherein $\chi\Lambda_l$ is an indicator function indicating in which class I a currently considered sample Y, or, more precisely, Y(i), is classified. The accurate placement of the sample in the class is thus provided, which improves a classification operation. Moreover an enhanced sample value can be efficiently obtained.

According to an embodiment, the indicator function $\chi\Lambda_l$, or, more precisely, $\chi\Lambda_l(i)$ is defined by $$\chi\Lambda_\ell(i) = \begin{cases} 1 & i \in \Lambda_\ell \\ 0 & i \notin \Lambda_\ell \end{cases}$$

and $$\Lambda_\ell = \{i \in I : C(i) = \ell\}.$$

wherein lambda l or $\Lambda_l$ is a class, I is a class index for each sample location i in the basic set of samples I; i is a sample location, or an index designating a sample or a sample location, in the basic set of samples I; C is a classification (for a sample location i); $\in$ is member-of-set operator; $\notin$ is a not-member-of-set operator.

According to an embodiment, the second denoising operation is configured to use a first to 2Lth offset value, e.g. Q(d1), . . . Q(d2L), for all samples of a video frame or an CTU classified into the respective classes [e.g. lambda1 or $\Lambda_1, \ldots,$ lambda2L or $\Lambda_{2L}$].

Alternatively or complementarily, the second denoising operation is configured to use an offset value, e.g. d0=0, for all samples of a video frame classified in a class which is complementary to I (=capital i), the class not including first to 2Lth, e.g. lambda0 or $\Lambda_0$.

According to an embodiment, the video decoder is configured to evaluate a bitstream flag, e.g. FLAG, to decide whether the second denoising operation is performed or not. The video decoder is for example configured to selectively perform the second denoising operation in dependence on a bitstream flag activating and deactivating the second denoising operation. The unnecessary filtering operations are thus minimized, which decreases the consumption of the operational resources.

According to an embodiment, the video decoder is configured to apply the second denoising operation independently to different YUV components, e.g. independently to a Y component and to a U component and to a V component representing a single pixel. This embodiment is based on the finding that an independent denoising of different colour components improves a denoising performance.

According to an embodiment, the second denoising operation uses same parameter set, for example $T_0, \ldots$, TL (being symmetric boundaries), $Q(d1) \ldots, Q(d2L)$, for the processing of a frame or each CTU.

According to an embodiment, the first denoising operation is a deblocking filter operation, for example DBFV, or the DBFV operation, in a first direction, and wherein second denoising operation is a first sample-adaptive-offset operation, for example SAOV, or the SAOV operation, e.g. using an associated parameter or an associated parameter set.

According to an embodiment, the video decoder is configured to apply a third denoising operation, e.g. DBFH, or the DBFH operation, which is a deblocking filter operation in a second direction, which is different from the first direction, using a result of the second denoising operation, e.g. $\tilde{Y}_2$, which is provided by SAOV, or the SAOV operation. The video decoder is complementarily configured to apply a fourth denoising operation, which is a sample-adaptive-offset operation, e.g. SAOH, or the SAOH operation, on the basis of a result, e.g. Y3, of the third denoising operation, for example on the basis of the third denoised sample information, e.g. on the basis of the output Y3 of DBFH, or the DBFH operation. The additional SAO filtering further reduces the coding artefacts of the DBF.

According to an embodiment, the second denoising operation and the fourth denoising operation use different parameters or parameter sets, e.g. T0, . . . , TL; Q(d1), . . . , Q(d2L) for the processing of a frame, or for the CTU. Using different parameter sets for the second and fourth denoising operations may provide further correction of the quality errors.

According to an embodiment, the video decoder is configured to apply a fifth denoising operation, e.g. SAO, or the SAO operation or ALF, or the ALF operation or a combination of SAO and ALF, or the SAO and ALF operations, on the basis of a result of the fourth denoising operation, e.g. SAOH, or the SAOH operation.

According to an embodiment, the fifth denoising operation, is for example a further SAO, or SAO operation, which uses different parameters or parameter sets, e.g. different Q(dl) for different CTUs. For example, the fifth denoising operation is according to $$\hat{y} = \sum_{l=0}^{L} X \Lambda_l \cdot (y + d_l)$$

where $\chi \Lambda_l$ is the indicator function defined, for example, by $$X \Lambda_l(i) = \begin{cases} 1 & i \in \Lambda_l \\ 0 & i \notin \Lambda_l \end{cases}$$

and $$\Lambda_l = \{i \in I : C(i) = l\},$$

which uses different parameters or parameter sets, e.g. different Q(dl) for different CTUs.

Embodiment of the invention creates a video encoder for providing an encoded video information on the basis of an input video information, such as "video input", x(i), or X, the video encoder is configured to obtain, a first sample information, for example a noisy first sample information, which considers a transform, for example of the input video information and/or of a prediction residual, into a spectral domain, a quantization of transform coefficients and a prediction, on the basis of the input video information, e.g. using a transformation, a quantization, an inverse quantization and an inverse transformation, and optionally using a prediction. The first sample information advantageously also considers an inverse quantization and an inverse transform which are performed at the side of an audio decoder, for example, values of a YUV image representation, e.g. pixel values, e.g. y1, Y1, Y2, $\tilde{Y}_2$, etc. The first sample information may, for example, represent a reconstructed noisy image which can be obtained by a video decoder, for example, using an entropy decoding, an inverse quantization and an inverse transform, e.g. before DBF, or a deblocking filter (DBF) operation, or before DBFV, or a deblocking filter for vertical edges (DBFV) operation, or before a combination of DBF and DBFV, or the DBF and DBFV operations, and/or before SAOV, or a sample adaptive offset for vertical edges (SAOV) operation and/or before DBFH, or a deblocking filter for horizontal edges (DBFH) operation, or before SAO, or a sample adaptive offset (SAO) operation and/or before ALF, or an adaptive loop filter (ALF), for example in case of PSAO, or a post sample adaptive offset (PSAO) filter operation, are applied.

According to an embodiment, the video encoder is configured to apply a first denoising operation, e.g. a noise reduction operation, for example a combination of DBF, SAO, ALF, or the DBF, SAO, ALF operations, or a combination of DBF and SAO, or the DBF and SAO operations, or one of said denoising operations, for example in case of PSAO, or the PSAO filter operation, or DBFV, or the DBFV operation and/or SAOV, or the SAOV operation and/or DBFH, or the DBFH operation are applied, in order to obtain a first denoised sample information, such as an output of SAO, or the SAO operation or an output of ALF, or the ALF operation, e.g. y2, on the basis of the first sample information, for example on the basis of the output Y of a combination of DBFV and DBFH, or the DBFV and DBFH operations, or on the basis of the output Y2 of DBFV, or the DBFV operation. The video encoder is configured to determine parameters, such as FLAG, Q(d1), Q(d2), of a second denoising operation, for example PSAO, or the PSAO operation, on the basis of a result of the first denoising operation, for example on the basis of the first denoised sample information, e.g. on the basis of the output of SAO or ALF, or the SAO or ALF operations, e.g. a single threshold value T, which can be chosen as a fixed positive constant wherein the threshold T can be determined, e.g. based on a rate distortion cost at the encoder. The video encoder is optionally also configured to perform the second denoising operation. The video encoder is configured to adjust, or for example adapt, the second denoising operation in dependence on differences, for example on y2(i)−y1(i); or on $Y_2-Y_1$ or on $Y-Y_1$, e.g. a difference between the output of DBFV, or the DBFV operation and samples before DBFV, or the DBFV operation or between samples before DBFH, or the DBFH operation and after DBFH, or the DBFH operation and $Y_3-\hat{Y}_2$, e.g. a difference between the output of DBFH, or the DBFH operation and the output of SAOV, or the SAOV operation respectively, for example, between samples before the first denoising operation and after the first denoising operation, in order to obtain the encoded video information.

This embodiment is based on the finding that adapting the second denoising operation in dependence of the difference before and after the first denoising operation can correct the quality reduction due to applying the first denoising operation. Thus, an effective noise filtering with the maintained video quality is provided by the embodiment. For example, the difference between samples before the first denoising operation and after the second denoising operation indicates in which areas the first denoising operation has a particularly large impact, and it is therefore possible to consider a knowledge, in which areas the first denoising operation has a particularly large impact when performing the subsequent second denoising operation. For example, one or more parameters of the second denoising operation may be adjusted (e.g. in a locally variable manner) in dependence on a (local) difference between samples (or corresponding samples) before the first denoising operation and after the first denoising operation. Worded differently, local variations of said difference may be used to locally adapt the second denoising operation. For example, it may be considered that a first type of second denoising operation—or a first parameter or parameter set of the second denoising operation—may provide a best result (and should therefore be applied) in regions in which said difference is comparably small, while a second type of second denoising operation— or a second parameter or parameter set of the second denoising operation—may provide a best result (and should therefore be used) in regions in which said difference is comparably larger.

Thus, it has been found that it is advantageous to adapt characteristics of the second denoising operation in dependence on said difference, since said difference describes, for example, how strongly the first denoising operation has affected the (first) sample information (e.g. in different areas of an image), and since a corresponding (possibly locally varying) adaptation of the second denoising operation brings along good image quality while keeping a latency and a computational effort reasonably small.

According to an embodiment, the second denoising operation is configured to classify samples, for example pixels, e.g. y(i), wherein y may be an input image for the PSAO, or the PSAO operation, or for example having sample indices i, into a plurality of classes, such as groups, lambda_1 or $\Lambda_1$, lambda_2 or $\Lambda_2$, lambda_0 or $\Lambda_0$, of samples in dependence on the difference, for example y2(i)− y1(i), between samples before the first denoising operation, e.g. y1(i), and after the first denoising operation, e.g. y2(i).

The video encoder is further configured, for example, to determine parameters of the second denoising operation in dependence on the classification. The second denoising operation is optionally configured, for example, to modify samples in dependence on the classification.

This embodiment is based on the finding that the filtering performance essentially relies on how the samples's classification behaves. Performing a successful classification of the samples in accordance with the difference between the noisy signal and the denoised signal and using this classification to modify samples in the second denoising operation minimizes errors in the samples occurred during the filtering in the first denoising operation. Besides, based on the conventional classification the samples' modification in the second denoising operation may be performed faster, thus decreasing encoding latency.

According to an embodiment, the second denoising operation is configured to conditionally add an offset to a plurality of samples in dependence on a classification of the respective samples. An offset is selected, for example, for each group of sample values or sample locations, sharing a same class index. The classification is based, for example, on a difference between a noisy (e.g. unfiltered) signal and a denoised (e.g. filtered) signal. Efficient removing of coding artefacts is provided in this embodiment.

Regarding the functionality that 'the second denoising operation, e.g. PSAO, SAOV or SAOH, or the PSAO, SAOV or SAOH operation, is configured to classify samples having sample indices . . . ' the following should be noted. The second denoising operation can be considered a sample-adaptive offset operation, for example SAO, SAOV, SAOH (4th), or the SAO, SAOV, SAOH (4th) operation, subsequent to one or a combination of DBF, or the DBF operation, DBFV, or the DBFV operation, DBFV and SAOV, or the DBFV and SAOV operations, SAOV or DBFH, or the SAOV and DBFH operations, DBFV and SAOV or DBFV, or the DBFV and SAOV or DBFV operations, or DBFV and SAOV and DBFV, or the DBFV and SAOV and DBFV operations, or a combination of DBFV and DBFH, or the DBFV and DBFH operations, which are connectable in series and can be executed successively.

In one embodiment, 'samples' are y(i) and y, which is a decoded input image for PSAO, or the PSAO filter operation. According to an embodiment, y, for example an input image, e.g. an input image of PSAO, or the PSAO operation, and y2, for example a first denoised image, are given as output of ALF, or the ALF operation, e.g. y, and as output of SAO, or the SAO operation, e.g. y2, respectively. In this case, y and y2 are different.

In another embodiment, on the other hand, when y2 is chosen to be output of ALF, or the ALF operation, the input image y, e.g. the input image of PSAO, or the PSAO operation, and y2 are the same images.

According to an embodiment, input image y, e.g. the input image of PSAO, or the PSAO operation, should, in some embodiments, be an output of ALF, or the ALF operation, since PSAO, or the PSAO operation is, in some embodiments, applied after in-loop filtering process, e.g. the combination of DBF+SAO+ALF, or the DBF+SAO+ALF operations.

In one embodiment, the first denoising operation comprises a deblocking filter, e.g. DBF, or the DBF operation; or e.g. DBFH and/or DBFV, or the DBFH and/or the DBFV, operation, which for example removes artifacts along block boundaries, e.g. using a low pass filtering of pixel values along block boundaries, and/or SAO, or a sample-adaptive offset filter operation. Different codings artefacts are effectively removed in such an embodiment.

In one embodiment, the sample-adaptive offset filtering, e.g. PSAO, SAOV or SAOH, or the PSAO, SAOV or SAOH operation, is configured to classify samples of an image into a plurality of classes in dependence on one or more edge patterns, e.g. along one or more directions, in the image in an environment of a sample under consideration, e.g. comprising the sample under consideration, and/or independence on a sample value of the sample under consideration, e.g. pixels, e.g. y(i), wherein y may be a decoded input image for SAO, or the SAO operation, e.g. having sample indices i. This embodiment is based on the finding that an effective partition of the set of all sample locations improves the filtering performance for each location. For example, a different impact of different edge patterns onto pixel values may be considered (and, for example, at least partially compensated) in this manner (wherein, for example, an error of pixel values may depend on the presence of one or more edges in an environment of the pixel under consideration). Moreover, a dependence of a pixel value error from the actual pixel value may, for example, be considered (and, for example, at least partially compensated) in this manner.

As a remark, it would be noted, that the conventional SAO, or SAO operation may, for example, apply a classification, for example, based on the following two features (or at least one of said features):

1) Each sample is assigned to one of, for example, 5 classes based on 1-D directional edge patterns, for example, along 4 directions, like, for example, horizontal, vertical, 135° diagonal and 45° diagonal.

2) Each sample is classified based on sample value range, for example, equally divided into, for example, 32 bands.

For example, the conventional SAO, or SAO operation is applied for each CTU (or for a plurality of coding tree units) with a classification selected among, for example, 5 different classifications as explained above—for example, 4 classifications based on edge information (horizontal+vertical+two diagonals)+for example, a classification based on sample value range which simply checks sample value itself to assign it to one of, for example, 32 bands.

According to an embodiment (or according to an aspect of the invention), the proposed classification is based on a different feature, namely a difference between a noisy (or an unfiltered) signal and a denoised (or a filtered) signal, for example, when compared to a classification used in SAO, or the SAO operation, which is, for example, based on an evaluation of samples of a single image or frame or CTU. This embodiment is based on the finding that considering a difference between the unfiltered and filtered signals allows a correction of quality errors occurred during the filtering operation.

In one embodiment, a first denoising operation (or the first denoising operation mentioned above) comprises ALF, or an adaptive loop filter (ALF) operation which performs a filtering, e.g. a linear filtering, or e.g a finite-impulse response filtering or e.g. an infinite impulse response filtering, for example of pixel values, using an impulse response, coefficients of which are encoded in the bitstream. This embodiment is based on the finding that different types of the adaptive loop filtering (ALF) increase coding gains. Also, such a filter, coefficients of which are encoded in the bitstream, can be adapted to a specific video content and therefore provide a good compromise between bitrate and quality (for example, when compared to a case in which the full bit budget is spent onto an encoding of pixel values).

In one embodiment, the video encoder is configured to apply the second denoising operation to a sample information, e.g. to an image; or e.g. to pixel values; or e.g. to YUV values of a YUV video representation; e.g. y(i), which is obtained using a combination, e.g. a sequence, of one or more deblocking filter operations, for example DBF, or the DBF operation, or e.g. DBFV and/or DBFH, or the DBFV and/or DBFH operations, one or more sample-adaptive offset filtering operations, e.g. SAO, or the SAO operation, or e.g. SAOH and/or SAOV, or the SAOH and/or SAOV operations, and ALF, or an adaptive loop filter (ALF) operation. This embodiment is based on the finding that usage of a plurality of different processing steps as the first denoising operation allows for a good initial denoising. Also, it has been found that a total change of a pixel value by such a sequence of different processing steps (which is represented by the difference between samples before the first denoising operation and samples after the first denoising operation) constitutes a reliable criterion for adapting the (subsequent) second denoising operation.

In one embodiment, the second denoising operation is configured to be applied to a number of Coding tree units (CTU)s which define a video frame, e.g. a picture as a whole. Alternatively or complementarily, the second denoising operation is configured to be applied to a video frame, e.g. a picture as a whole, consisting of Coding Tree Units (which may, for example, define the video frame)

For example, the CTU may be the basic processing unit and the CTUs can, for example, use larger block structures of, for example, up to 64×64 pixels and can better sub-partition the picture into variable sized structures. High Efficiency Video Coding (HEVC) uses, for example, CTUs up to 64×64 only. However larger CTU such as, for example, 128×128 can be used in quadtree plus binary tree (QTBT) setting adopted to a preliminary draft of a new video coding standard. This embodiment is based on the finding that a block based classification may reduce a complexity of filtering process.

In one embodiment, the classification of the samples into a plurality of classes only occurs when one or more predetermined threshold values, e.g. T, which can be chosen as a fixed positive constant e.g., dependent on human visual perception, or e.g. a single threshold value T, e.g. a single threshold value T, which can be encoded at encoder or chosen as a fixed positive constant, e.g. the threshold T can be determined based on a rate distortion (RD) cost at the encoder, is reached. Accordingly, for example, unnecessary filtering operations are thus excluded, which decreases the encoding latency and decreases a consumption of operational resources.

In one embodiment, the second denoising operation is configured to classify samples for example a currently considered sample, e.g. pixel, into three or more classes in dependence on whether a difference between corresponding samples before the first denoising operation, e.g. $y_1[i]$ or Y1 or $\hat{Y}_2$, and after the first denoising operation, e.g. y2[i], fulfils a first condition, e.g. y2(i)−y1(i)>T, or a second condition, e.g. y2(i)−y1(i)←T, or a third condition, e.g. −T<=y2(i)−y1(i)<=T. Alternatively, the second denoising operation is configured to classify samples in dependence on whether a combined, e.g. an optionally weighted, difference value, e.g. f(i), which is based on a plurality of differences, e.g. weighted differences, between corresponding samples, e.g. in a predetermined environment of a currently considered sample, before the first denoising operation and after the first denoising operation, fulfils a first condition, e.g. f(i)>T, or a second condition, e.g. f(i)←T, or a third condition, e.g. $-T<=f(i)<=T$. An improved tradeoff between the compression performance and encoding speed is thus provided. Moreover, the classification may be used to adapt the second denoising operation to the effectiveness of the first denoising operation, or to the change of one or more pixel values caused by the first denoising operation.

In one embodiment, the second denoising operation is configured to classify samples into three or more classes in dependence on a magnitude, or e.g. absolute value, of the difference between corresponding samples before the first denoising operation, e.g. $y_1[i]$, or e.g. Y1 or $\tilde{Y}_2$, and after the first denoising operation, e. g., y2[i], or Y2, Y3 or Y, and in dependence on a sign of the difference between corresponding samples before the first denoising operation, e.g. $y_1[i]$, or Y1 or $\tilde{Y}_2$, and after the first denoising operation, e.g. y2, or Y2, Y3 or Y. A respective sample is, for example, allocated to class 3, lambda0 or $\Lambda_3$, if the absolute value of said difference is smaller than T or equal to T, and the respective sample is, for example, allocated to class 1, lambda1 or $\Lambda_1$, if the absolute value of the difference is larger than T and the sign of the difference, e.g. y2(i)–y1(i), is positive, and the respective sample is, for example, allocated to class 2, lambda2 or $\Lambda_2$, if the absolute value of the difference is larger than T and the sign of the difference, e.g. y2(i)–y1(i), is negative, or e.g., for more than three classes according to lamda1 or $\Lambda_1, \ldots$, lamda2L or $\Lambda_{2L}$ wherein more than one threshold is assigned in accordance to $$\Lambda_\ell = \{i \in I : T_{\ell-1} \leq (Y_1(i) - Y(i)) < T_\ell\}$$

and $$\Lambda_{\ell+L} = \{i \in I : T_{\ell-1} \leq (Y(i) - Y_1(i)) < T_\ell\}$$

for $\ell = 1, \ldots, L$ and $$\Lambda_0 = I \cap (\Lambda_1 \cup \cdots \cup \Lambda_{2L})^c$$

This approach increases an accuracy of the sample allocation into one of the classes and provides a successful partitioning (and/or classification) of the set of all sample locations.

In one embodiment, the second denoising operation is configured to classify samples into three classes according to $$\Lambda_1 = \{i \in I : (y_2(i) - y_1(i)) > T\}$$

and $$\Lambda_2 = \{i \in I : (y_2(i) - y_1(i)) < -T\}$$

$$\Lambda_0 = I \cap (\Lambda_1 \cup \Lambda_2)^c$$

wherein lambda1 or $\Lambda_1$ is a set of samples, e.g. pixels, associated with a first class, lambda2 or $\Lambda_2$ is a set of samples, e.g. pixels, associated with a second class, lambda0 or $\Lambda_0$ is a set of samples, e.g. pixels, associated with a third class, T is a predetermined value, e.g. a fixed positive constant or a advantageously positive value encoded in the bitstream representing the encoded video content; I is a basic set of samples; $\cap$ is a cutting set operator—intersection; $\cup$ is a merge set operator—union; and $^c$ is a complementary set operator. This new classification provides an improved efficiency of the second denoising operation and allows for an efficient adaptation of the second denoising operation in accordance with the pixel values changes caused by the first denoising operation. For example, the classification allows for a discrete set of pixel value modifications which are performed in the second denoising operation.

In one embodiment, the second denoising operation is configured to determine a combination, e.g. a weighted sum, of weighted differences, e.g. f(i), which combines a plurality of differences, e.g. y2(i)–y1(i), between corresponding samples in a predetermined environment of a currently considered sample before the first denoising operation and after the first denoising operation, in order to obtain the combined difference value, e.g. f(i), associated with the currently considered sample, e.g. having sample index i. A difference associated with a currently considered sample may have, for example, a larger weight than a difference associated with a sample neighboring the currently considered sample. An improved accuracy of samples classification is thus provided, and an environment of a currently considered adjacent samples may for example be exploited, and the classification may be more "smooth", for example due to the consideration of a plurality of sample value differences in a single classification step. Accordingly, an introduction of excessive artifacts in the second denoising operation may be avoided.

According to an embodiment, the second denoising operation is configured to determine the combined difference value f(i) according to $$f(i) = \sum_{j \in N(i)} w(i - j) \cdot (y_2(j) - y_1(j))$$

wherein j is a sample index, N(i) is a set of samples, e.g. neighboring samples, or for example sample locations, to be considered for the determination of the combined difference value associated with a sample under consideration having a sample index i; w(i–j), e.g. also designated as w(i,j), is a set of predetermined weight values, for example non-negative weight values or positive weight values, associated with a plurality of sample locations in the environment of the sample under consideration; y2(j)–y1(j) or $y_2(j)-y_1(j)$ is a difference between corresponding samples, e.g. having sample index j, before the first denoising operation and after the first denoising operation. An improved accuracy of samples classification is thus provided. In this embodiment the weighted average difference f(i) may be optionally used to construct $\Lambda 0, \ldots, \Lambda 2$ or $\Lambda_0, \ldots, \Lambda_2$, for example, as disclosed herein.

In one embodiment, the second denoising operation is configured to select a quantized offset value, e.g. Q(d1), Q(d2), 0, to each sample i, for example frame, e.g. each of YUV components, or group of sample locations sharing a same class index I associated with the classification, in dependence on the classification C. An offset value Q(d1) is, for example, added to a sample under consideration if the sample under consideration is classified to be in a first class I=1, wherein an offset value Q(d2) is added to the sample under consideration if the sample i under consideration is classified to be in a second class I=2, and wherein the sample under consideration is left unchanged is the sample i under consideration is classified to be in a third class. Accordingly, the value added to a pixel value or subtracted from a pixel value may, for example, be dependent on the classification. Thus, it is, for example, possible to compensate for a bias of the pixel values which correlates with the difference between pixel values before and after the first denoising operation.

In one embodiment, the second denoising operation is configured to select the offset value using one or more offset values encoded in the encoded video information, for example using two offset values Q(d1), Q(d2) encoded in a bitstream representing the encoded video information. This embodiment minimizes errors between samples before and after the first denoising operation. Also, the effect of the second denoising operation can be optimized by an appropriate signaling of the offset values in the bitstream, while keeping a bitrate overhead reasonably small since the number of offset values is relatively small and since the offset values may be updated only rarely.

In one embodiment, the second denoising operation is configured to yield an enhanced sample value ŷ, or, more precisely, ŷ(i), wherein i is an index designating a currently handled sample value, according to $$\hat{y} = \sum_{\ell=0}^{2} \chi \Lambda_\ell \cdot (y + Q(d_\ell))$$

wherein $d_l$ is an offset value corresponding to a class; I is a class index; Q is a quantization-function; y, or, more precisely, y(i), is a sample value, e.g. a pixel value, input into the second denoising operation, which may be provided by the first denoising operation or on the basis of a result of the first denoising operation, or which may, for example, be provided by an ALF processing; $\chi\Lambda_l$ is an indicator function indicating in which class I a currently considered sample y, or, more precisely, y(i), is classified. The accurate placement of the sample in the class is thus provided, which improves a classification operation.

In one embodiment, the indicator function $\chi\Lambda_l$, or, more precisely, $\chi\Lambda_l(i)$ is defined by $$\chi\Lambda_\ell(i) = \begin{cases} 1 & i \in \Lambda_\ell \\ 0 & i \notin \Lambda_\ell \end{cases}$$

and $$\Lambda_\ell = \{i \in I : C(i) = \ell\}.$$

$\Lambda_l$ lambda is a class; wherein I is a class index for each sample location i in the basic set of samples I; i is a sample location, or an index designating a sample or a sample location, in the basic set of samples I; C is a classification (for a sample location i); ∈ is member-of-set operator; ∉ is a not-member-of-set operator.

In one embodiment, the second denoising operation is configured to use a first offset value, e.g. Q(d1), for all samples of a video frame classified into a first class, e.g. lambda1 or $\Lambda_1$. Alternatively or complementarily, the second denoising operation is configured to use a second offset value, e.g. Q(d2), for all samples of a video frame classified into a second class, e.g. lambda2 or $\Lambda_2$. Alternatively or complementarily, the second denoising operation is configured to use a third offset value, e.g. d0=0, for all samples of a video frame classified into a third class, e.g. lambda0 or $\Lambda_0$.

In one embodiment, the video encoder is configured to evaluate a bitstream flag, e.g. FLAG, to decide whether the second denoising operation is performed or not, e.g. the video encoder is configured to selectively perform the second denoising operation in dependence on a bitstream flag activating and deactivating the second denoising operation. The unnecessary filtering operations are thus minimized, which decreases the consumption of the operational resources.

In one embodiment, the video encoder is configured to apply the second denoising operation independently to different YUV components, e.g. independently to a Y component and to a U component and to a V component representing a single pixel. This embodiment is based on the finding that an independent denoising of different colour components improves a denoising performance.

In one embodiment, the video encoder is configured to determine one or more offset values, e.g. d1 or Q(d1) or d2 or Q(d2), which are used in the second denoising operation, on the basis of the input video representation and in dependence on a classification of samples performed on the basis of the differences between samples before the first denoising operation and after the first denoising operation. An improved accuracy of placement of the sample in the class is thus provided.

In one embodiment, the video encoder is configured to determine an offset value ($d_l$) associated with a set of samples classified into a given class, e.g. a class having class index I, in dependence on a deviation, e.g. an average deviation, between input samples of the second denoising, e.g. y(i), classified into the given class and corresponding samples of the input video information, e.g. x(i).

In one embodiment, the video encoder is configured to determine an offset value ($d_l$) associated with a set of samples classified into a given class, such that a mean square error between input samples of the second denoising, e.g. y(i), classified into the given class and corresponding samples of the input video information, e.g. x(i), is minimized or is brought below a predetermined threshold.

In one embodiment, the video encoder is configured to determine an offset value $d_l$ associated with a set of samples classified into a given class having a class index I according to $$d_\ell = \frac{1}{\#(\Lambda_\ell)} \sum_{i \in \Lambda_\ell} (x(i) - y(i))$$

wherein $\#(\Lambda_l)$ is a number of samples classified into a class having class index I; $\Lambda_l$ is a set of samples classified into the class having class index I; i is a sample index; x(i) are sample values of the input video information; and y(i) are sample values input into the second denoising operation.

In one embodiment, the second denoising operation is configured to classify samples into a plurality of classes according to:

$$\Lambda_\ell = \{i \in I : T_{\ell-1} \le (Y_1(i) - Y(i)) < T_\ell\} \text{ and}$$
$$\Lambda_{\ell+1} = \{i \in I : T_{\ell-1} \le (Y(i) - Y_1(i)) < T_\ell\}$$
$$\text{for } \ell = 1, \ldots, L \text{ and}$$
$$\Lambda_0 = I \cap (\Lambda_1 \cup \ldots \cup \Lambda_{2L})^c$$

wherein lambdaI or $\Lambda_l$ is a set of samples, e.g. pixels, associated with a class 1, . . . , 2L; lambda0 or $\Lambda_0$ is a set of samples, e.g. pixels, associated with a class excluding class(es) 1, ..., 2L; Tl-1 to Tl or $T_{l-1}$ to $T_l$ are predetermined values, for example a fixed positive constant or a advantageously positive value encoded in the bitstream representing the encoded video content; I (=capital i) is a basic set of samples; ∩ is a cutting set operator—intersection; ∪ is a merge set operator—union; and $^c$ is a complementary set operator. This new classification into multiple classes (more than three) provides an improved accuracy of the classification and improved efficiency of detection and correction of errors between samples before and after the first denoising operation.

In one embodiment, Tl-1 to Tl or $T_{l-1}$ to $T_l$ are symmetrical class boundaries, e.g. symmetrical to zero, for differences, for example y2(i)–y1(i) or Y–Y1 or $Y_2-Y_1$ or $Y_3-\hat{Y}_2$, between samples before the first denoising operation, e.g. a combination of DBFV and DBFH, or DBFV, or the DBFV and DBFH, or DBFV operations, and after the first denoising operation, e.g. a combination of DBFV and DBFH, or DBFV, or the DBFV and DBFH, or DBFV operations, in order to obtain a classification for the individual samples, e.g., pixel positions.

In one embodiment, the second denoising operation is configured to select (or associate) a quantized offset value, e.g. Q(d1), Q(d2), ..., Q(d2L), 0, to each sample i, e.g. a frame, e.g. each of YUV components, or group of sample locations sharing a same class index I associated with the classification, in dependence on the classification C. For example when L=1, an offset value Q(d1) is added to a sample under consideration if the sample under consideration is classified to be in a first class I=1. For example an offset value Q(d2) is added to the sample under consideration if the sample i under consideration is classified to be in a second class I=2. For example the sample under consideration is left unchanged if the sample i under consideration is classified to be in a third class I=0. An improved accuracy of placement of the sample in the class is thus provided.

In one embodiment, the second denoising operation is configured to select the offset value using offset values encoded in the encoded video information, for example using two offset values Q(d1) and Q(d2) (when L=1) encoded in a bitstream representing the encoded video information. The number of offsets $Q(d_1), \ldots, Q(d_{2L})$ should typically be even and d0=0. Therefore, the second denoising operation can be applied, for example, for a number of CTUs or a frame, whereby the offsets $Q(d_1), \ldots, Q(d_{2L})$ are encoded for each of those CTUs or the frame respectively. This embodiment minimizes errors using offset information communicated in the video bitstream.

In one embodiment, the second denoising operation is configured to yield an enhanced sample value $\tilde{Y}$, or for example, more precisely, $\tilde{Y}(i)$ or $\hat{Y}$ or $\hat{Y}(i)$, wherein i is an index designating a currently handled sample value, according to $$\hat{Y} = \sum_{\ell=0}^{2L} \chi\Lambda_\ell \cdot (Y + Q(d_\ell))$$

wherein dl is an offset value corresponding to a class; I is a class index; Q is a quantization-function; Y, or, more precisely, Y(i), is a sample value, e.g. a pixel value, input into the second denoising operation, which may be provided by the first denoising operation or on the basis of a result of the first denoising operation, or which may, for example, be provided by an ALF processing; $\chi\Lambda_l$ is an indicator function indicating in which class I a currently considered sample Y, or for example, more precisely, Y(i), is classified. The accurate placement of the sample in the class is thus provided, which improves a classification operation. Moreover, an enhanced sample value can be efficiently obtained.

In one embodiment, the indicator function $\chi\Lambda_l$, or, more precisely, $\chi\Lambda_l(i)$, is defined by $$\chi\Lambda_\ell(i) = \begin{cases} 1 & i \in \Lambda_\ell \\ 0 & i \notin \Lambda_\ell \end{cases}$$

and $$\Lambda_\ell = \{i \in I : C(i) = \ell\}.$$

$\Lambda_l$ lambda is a class; wherein I is a class index for each sample location i in the basic set of samples I; i is a sample location, or for example an index designating a sample or a sample location, in the basic set of samples I; C is a classification (for a sample location i); ∈ is member-of-set operator; and ∉ is a not-member-of-set operator.

In one embodiment, the second denoising operation is configured to use a first to 2Lth offset value, e.g. Q(d1), ... Q(d2L), for all samples of a video frame or CTU classified into the respective classes, e.g. lambda1 or $\Lambda_1, \ldots,$ lambda2L or $\Lambda_{2L}$. Alternatively or complementarily, the second denoising operation is configured to use an offset value, e.g. d0=0, for all samples of a video frames classified in a class which is complementary to I (=capital i), for example class not including first to 2Lth, e.g. lambda0 or $\Lambda_0$.

In one embodiment, the video encoder is configured to evaluate a bitstream flag, e.g. FLAG, to decide whether the second denoising operation is performed or not, e.g. the video decoder is configured to selectively perform the second denoising operation in dependence on a bitstream flag activating and deactivating the second denoising operation. The unnecessary filtering operations are thus minimized, which decreases the consumption of the operational resources.

In one embodiment, the video encoder is configured to apply the second denoising operation independently to different YUV components, for example independently to a Y component and to a U component and to a V component representing a single pixel. This embodiment is based on the finding that an independent denoising of different colour components improves a denoising performance.

In one embodiment, the second denoising operation uses same parameter set, for example $T_0, \ldots,$ TL (being symmetric boundaries); Q(d1) ..., Q(d2L), for the processing of a frame or each CTU.

In one embodiment, the first denoising operation is a deblocking filter operation, for example DBFV, or the DBFV operation, in a first direction, and wherein the second denoising operation is a first sample-adaptive-offset, for example SAOV, or the SAOV, operation, e.g. using an associated parameter or an associated parameter set.

In one embodiment, the video decoder is configured to apply a third denoising operation, e.g. DBFH, or the DBFH operation, which is deblocking filter operation in a second direction, which is for example different from the first direction, using a result of the second denoising operation, e.g. $\hat{Y}_2$, which is provided for example by SAOV, or by the SAOV operation. In this embodiment, the video decoder is further configured to apply a fourth denoising operation, which is a sample-adaptive-offset operation, e.g. SAOH, or the SAOH operation, on the basis of a result, e.g. Y3, of the third denoising operation, e.g on the basis of the third denoised sample information, e.g. on the basis of the output Y3 of DBFH, or the DBFH operation.

In one embodiment, the second denoising operation and fourth denoising operation use different parameters or parameter sets, for example TO, . . . , TL; Q(d1), . . . , Q(d2L), for the processing of a frame, or for example for CTU.

In one embodiment, the video decoder is configured to apply a fifth denoising operation, e.g. SAO, or the SAO operation or ALF, or the ALF operation or a combination of SAO and ALF, or the SAO and ALF operations, on the basis of a result of the fourth denoising operation, for example SAOH, or the SAOH operation.

According to an embodiment, the fifth denoising operation, is for example a further SAO, or SAO operation, which uses different parameters or parameter sets, e.g. different Q(dl) for different CTUs. For example, the fifth denoising operation is according to $$\hat{y} = \sum_{l=0}^{L} \chi\Lambda_l \cdot (y + d_l)$$

where $\chi\Lambda_l$ is the indicator function defined, for example, by $$\chi\Lambda_l(i) = \begin{cases} 1 & i \in \Lambda_l \\ 0 & i \notin \Lambda_l \end{cases}$$

and $$\Lambda_l = \{i \in I : C(i) = l\},$$

which uses different parameters or parameter sets, e.g. different Q(dl) for different CTUs.

An embodiment of the invention creates a method for providing a decoded video information on the basis of an encoded video information, e.g. a video input. The method comprises obtaining first sample information, for example a noisy sample information, for example, values of a YUV image representation, e.g. pixel values, e.g. y1, on the basis of the encoded video information, for example using an entropy decoding of a bitstream, an inverse quantization and an inverse transformation, and optionally using a prediction. The method further comprises applying a first denoising operation, for example a noise reduction operation; e.g. a combination of DBF, SAO, ALF, or the DBF, SAO, ALF operations, or a combination of DBF and SAO, or the DBF and SAO operations, or one of said denoising operations, or a combination of DBFV and DBFH, or the DBFV and DBFH operations, or, e.g. only, DBFV, or the DBFV operation, in order to obtain a first denoised sample information, e.g. an output of SAO, or the SAO operation, or an output of ALF, or the ALF operation, or an output of a combination of DBFV and DBFH, or the DBFV and DBFH operations, or an output of DBFV, or the DBFV operation, e.g. y2, on the basis of the first sample information. The deblocking filter DBF consists, for example, of one or two filtering operations, namely deblocking filter for vertical edges (DBFV) or/and deblocking filter for horizontal edges DBFH, which means DBF=DBFV or DBFH or DBFV+ DBFH and the deblocking filter can be a conventional deblocking filter.

The method according to this embodiment is based on the same considerations as a decoder described above. Moreover, this disclosed embodiment may optionally be supplemented by any other features, functionalities and details disclosed herein in connection with the decoder, both individually and taken in combination.

The method further comprises applying a second denoising operation, e.g. PSAO, or the PSAO operation, or e.g., SAO, or the SAO operation, e.g., SAOV, or the SAOV operation, on the basis of a result of the first denoising operation, e.g. on the basis of the first denoised sample information, e.g. on the basis of the output of SAO or ALF, or the SAO operation or the ALF operation, or on the basis of the output Y of a combination of DBFV and DBFH, or the DBFV and DBFH operations, or on the basis of the output Y2 of DBFV, or the DBFV operation. The method further comprises adjusting, or for example adapting, the second denoising operation, e.g. SAO, or the SAO operation, or SAOV, or the SAOV operation. in dependence on differences, e.g. y2(i)−y1(i) or Y−Y1 or Y2−Y1, between samples before the first denoising operation, e.g. a combination of DBFV and DBFH or DBFV, or the DBFV and DBFH, or DBFV operations, and after the first denoising operation, e.g. a combination of DBFV and DBFH or DBFV, or the DBFV and DBFH or DBFV operations, in order to obtain the decoded video information.

SAOV and SAOH, or the SAOV and SAOH operations here indicating classification for SAOV and SAOH which are based on $Y_2-Y_1$ or $Y-Y_1$, e.g. a difference between the output of DBFV, or the DBFV operation and samples before DBFV, or the DBFV operation or between samples before DBFH, or the DBFH operation and after DBFH, or the DBFH operation and $Y_3-\tilde{Y}_2$, e.g. a difference between the output of DBFH, or the DBFH operation and the output of SAOV, or the SAOV operation respectively.

An embodiment of the invention creates a method for providing an encoded video information on the basis of an input video information, e.g. a video input, x(i). The method comprises obtaining first sample information, for example a noisy sample information, which considers a transform, for example of the input video information and/or of a prediction residual, into a spectral domain, a quantization of transform coefficients and a prediction. The first sample information, for example, advantageously also considers an inverse quantization and an inverse transform which are performed at the side of an audio decoder, for example, values of a YUV image representation, e.g. pixel values, e.g. y1, on the basis of the input video information, e.g. using transform, a quantization, an inverse quantization and an inverse transformation, and optionally using a prediction. For example, the first sample information may represent a reconstructed noisy image which can be obtained by a video encoder using an entropy encoding, an inverse quantization and an inverse transform, e.g. before DBF, or a DBF operation, SAO, or a SAO operation and ALF, or an ALF operation are applied.

The method according to this embodiment is based on the same considerations as an encoder described above. Moreover, this disclosed embodiment may optionally be supplemented by any other features, functionalities and details disclosed herein in connection with the encoder, both individually and taken in combination.

In one embodiment, the method comprises applying a first denoising operation, e.g. a noise reduction operation, e.g. a combination of DBF, SAO, ALF, or the DBF, SAO, ALF operations, or a combination of DBF and SAO, or the DBF and SAO operations, or one of said denoising operations, or a combination of DBFV and DBFH, or the DBFV and DBFH operations, or, e.g. only DBFV, or the DBFV operation, in order to obtain a first denoised sample information, e.g. an output of SAO, or the SAO operation or an output of ALF, or the ALF operation, or an output of a combination of DBFV and DBFH, or the DBFV and DBFH operations, or an output of DBFV, or the DBFV operation, e.g. y2, on the basis of the first sample information. In this embodiment the method further comprises determining parameters, e.g. FLAG, Q(d1), Q(d2), of a second denoising operation, e.g. of PSAO, or the PSAO, operation or SAOV, or the SAOV operation or SAOH, or the SAOH operation, on the basis of a result of the first denoising operation, e.g on the basis of the first denoised sample information, e.g. on the basis of the output of SAO or ALF, or the SAO or ALF operation, and for example optionally also performing the second denoising operation. In this embodiment, the method further comprises adjusting, or for example adapting, the second denoising operation in dependence on differences, e.g. y2(i)−y1(i), or Y−Y1 or Y2−Y1, between samples before the first denoising operation, e.g. a combination of DBFV and DBFH, or DBFV, or the DBFV and DBFH, or DBFV operations, and after the first denoising operation, e.g. a combination of DBFV and DBFH, or DBFV, or the DBFV and DBFH, or DBFV operations, in order to obtain the encoded video information.

An embodiment creates a computer program for performing the above indicated methods when the computer program runs on a computer.

An embodiment creates an encoded video representation, e.g. a bitstream, representing a video content. The encoded video representation comprises: an encoded representation of transform coefficients; and a plurality of offset values, e.g. d1, associated with a second denoising operation, e.g. defining offsets to be added to samples of different classes in a second denoising operation, wherein the classification of samples into a plurality of classes or classes of samples is made for example in dependence on the difference of samples before the first denoising operation and after the first denoising operation. In this embodiment the second denoising operation is for example performed on the basis of a result of the first denoising information. In this embodiment the offset values are associated with a plurality of classes of samples in dependence on a difference between samples before a first denoising operation, e.g. y1(i), and after the first denoising operation.

In an embodiment, the encoded video representation further comprises a flag indicating whether the second denoising operation should be performed or not.

BRIEF DESCRIPTION OF THE DRAWINGS

Embodiments of the present invention will be detailed subsequently referring to the appended drawings, in which.

DETAILED DESCRIPTION OF THE INVENTION

1. Video Decoder According to FIG. 1

Figure 1:
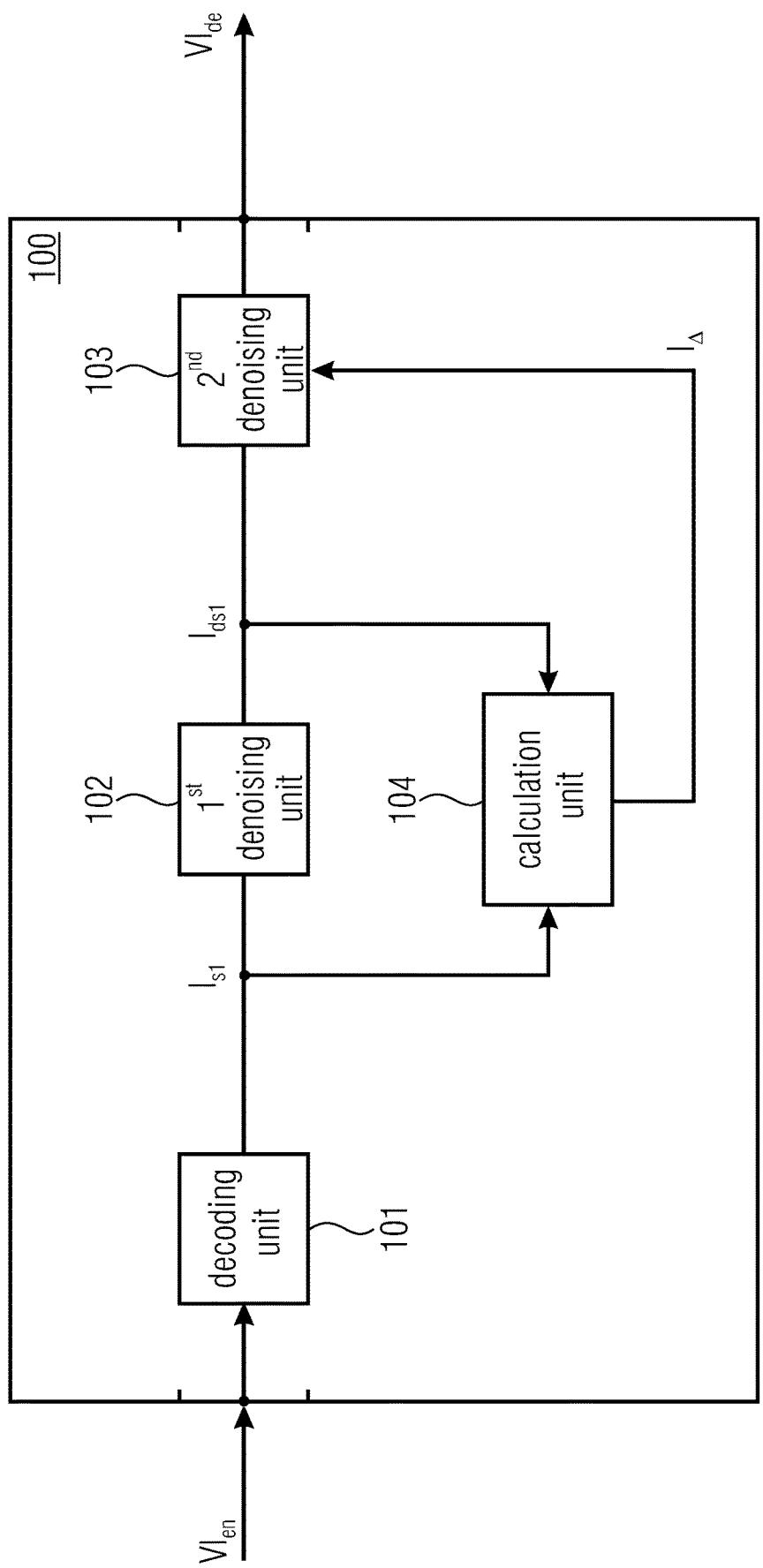
FIG. 1 shows a block diagram of a decoder (or video decoder) 100 in accordance with an embodiment.

A video decoder 100 in accordance with an embodiment is presented in FIG. 1.

The video decoder 100 receives an encoded video information, shown as a video input or a video signal $VI_{en}$. A decoding unit 101 of the video decoder 100 obtains a first sample information $I_{s1}$ on the basis of the encoded video information. The first sample information is a combination of the video signal and the noise signal (noise+signal information) and may include, for example, values of a YUV image representation, such as pixel values. The decoding unit 101 is implemented, for example, using an entropy decoding of a bitstream, an inverse quantization and an inverse transformation, and optionally using a prediction.

A first denoising unit 102 performs a first denoising operation to reduce the noise and to obtain a first denoised sample information $I_{ds1}$ based on the first sample information $I_{s1}$. The first denoising unit 102 may, for example, comprise a denoising filter or a combination of denoising filters, including, for example, one of: a deblocking filter (DBF) operation, a sample-adaptive offset (SAO) filter operation, an adaptive loop filter (ALF) operation, or a combination of the DBF operation and the SAO operation, or one of said denoising operations, or a combination of a deblocking filter for vertical edges (DBFV) and a deblocking filter for horizontal edges (DBFH), or only the DBFV. The deblocking filter (DBF) may, for example, consist of one or two filtering operations, namely deblocking filter for vertical edges (DBFV) or/and deblocking filter for horizontal edges DBFH, which means DBF=DBFV or DBFH or DBFV+DBFH, and the deblocking filter can be a conventional deblocking filter.

The second denoising unit 103 applies a second denoising operation on the basis of a result of the first denoising operation in order to obtain the decoded video information $VI_{de}$ which is output from the video decoder 100. The second denoising unit 103 may, for example, comprise a denoising filter or a combination of denoising filters, including one of: a post sample-adaptive offset (PSAO) filter operation, or the SAO filter operation, or the SAO filter for vertical edges (SAOV) operation.

The second denoising unit 103 is further configured to adjust the second denoising operation, in dependence on differences $I_A$ between samples before the first denoising operation and after the first denoising operation, in order to obtain the decoded video information. For example, an offset may be included into a plurality of samples in dependence on a classification of the respective samples. The samples may, for example, be classified based on the differences between samples before the first denoising operation and after the first denoising operation. The offset is selected for each group of sample values or sample locations, sharing a same class index. The indicated differences are determined by a calculation unit 104.

Accordingly, the second denoising, which is performed by the second denoising unit, may be well adapted to a change of one or more sample values by the first denoising operation.

It should be noted that the video decoder 100 may optionally be supplemented by any of the features, functionalities and details disclosed herein, both individually and taken in combination.

2. Video Encoder According to FIG. 2

Figure 2:
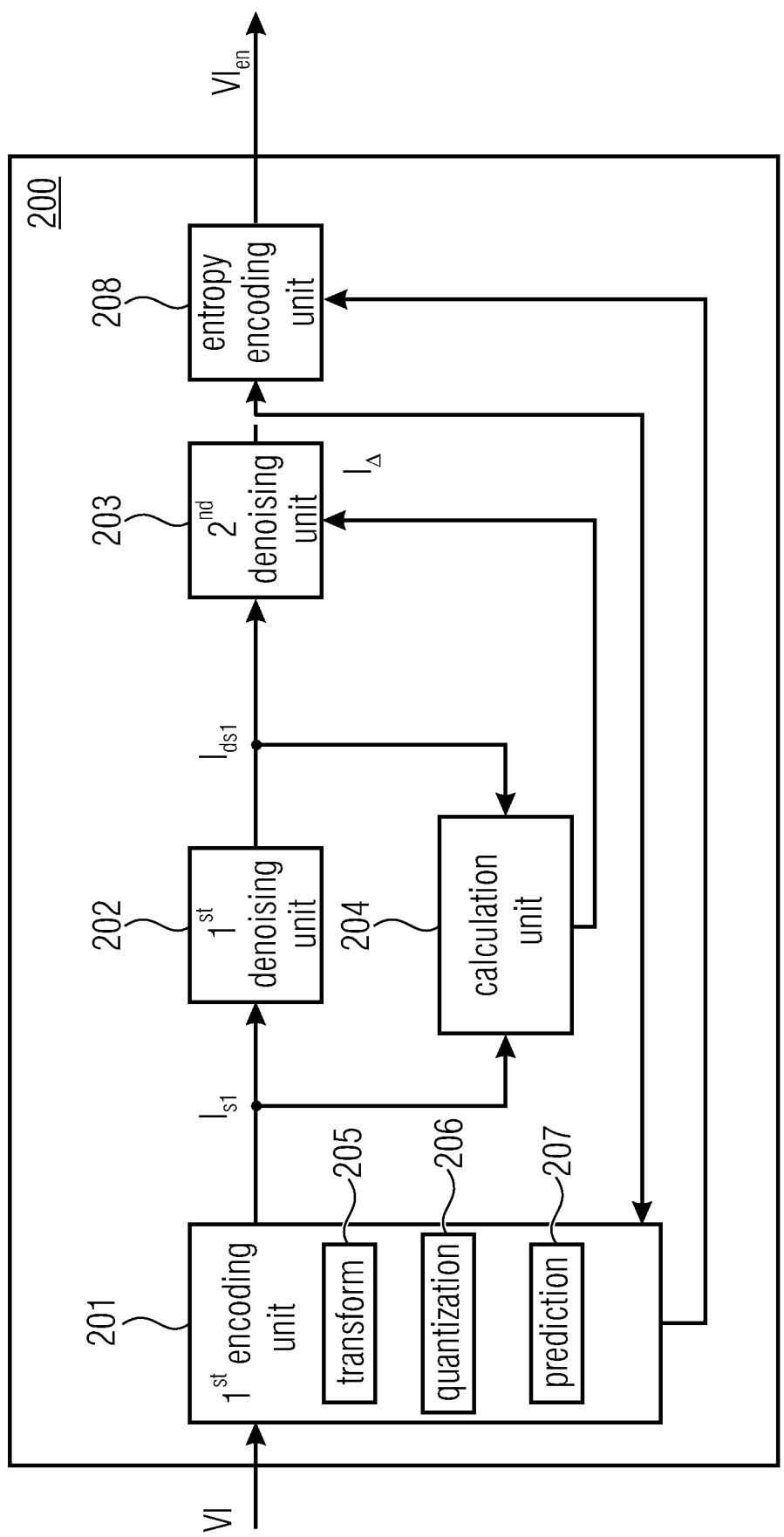
FIG. 2 shows a block diagram of an encoder (or video encoder) 200 in accordance with an embodiment.

A video encoder 200 in accordance with an embodiment is presented in FIG. 2. The video encoder 200 receives an input video information, shown as a video input or video signal VI in FIG. 2.

The first encoding unit 201 is configured to obtain a first sample information $I_{s1}$ (which may, for example, comprise one or more pixel values) on the basis of the input video information VI. The first encoding unit 201 includes, for example, a transform unit 205 which considers (or performs) a transform (e.g. of pixel values) into a spectral domain, a quantization unit 206 which considers (or performs) a quantization of transform coefficients and a prediction unit 207 considering (or performing) prediction.

The first denoising unit 202 is configured to apply a first denoising operation, e.g. a noise reduction operation, in order to obtain a first denoised sample information $I_{ds1}$ on the basis of the first sample information $I_{s1}$. The second denoising unit 203 is configured to perform a second denoising operation. The video encoder 200 is, for example, configured to determine parameters, such as FLAG, Q(d1), Q(d2), of a second denoising operation, for example the PSAO operation, on the basis of a result of the first denoising operation, for example on the basis of the first denoised sample information, e.g. on the basis of the output of the SAO or ALF operations, e.g. a single threshold value T, which can be chosen as a fixed positive constant wherein the threshold T can be determined, e.g. based on a rate distortion cost at the encoder.

The second denoising unit 203 is further configured to adjust, or for example adapt, the second denoising operation in dependence on differences $I_A$ between samples before the first denoising operation and after the first denoising operation, in order to obtain an encoded video information $VI_{en}$ (e.g. to obtain a reference video information, which reflects a video information which can be reconstructed at the side of a video decoder, and which may be used in a determination of motion prediction parameters and in a determination of a motion prediction residual, which is finally used to derive the encoded video information). The indicated differences are determined by a calculation unit 204.

The final entropy encoding is performed by the entropy encoding unit 208 in order to obtain the encoded video information. However, it should be noted that the entropy encoding unit may, for example, encode quantized transform coefficients, motion prediction information and one or more denoising parameters (as well as additional side information).

It should be noted that the video encoder 200 may optionally be supplemented by any of the features, functionalities and details disclosed herein, both individually and taken in combination.

3. Method According to FIG. 3

Figure 3:
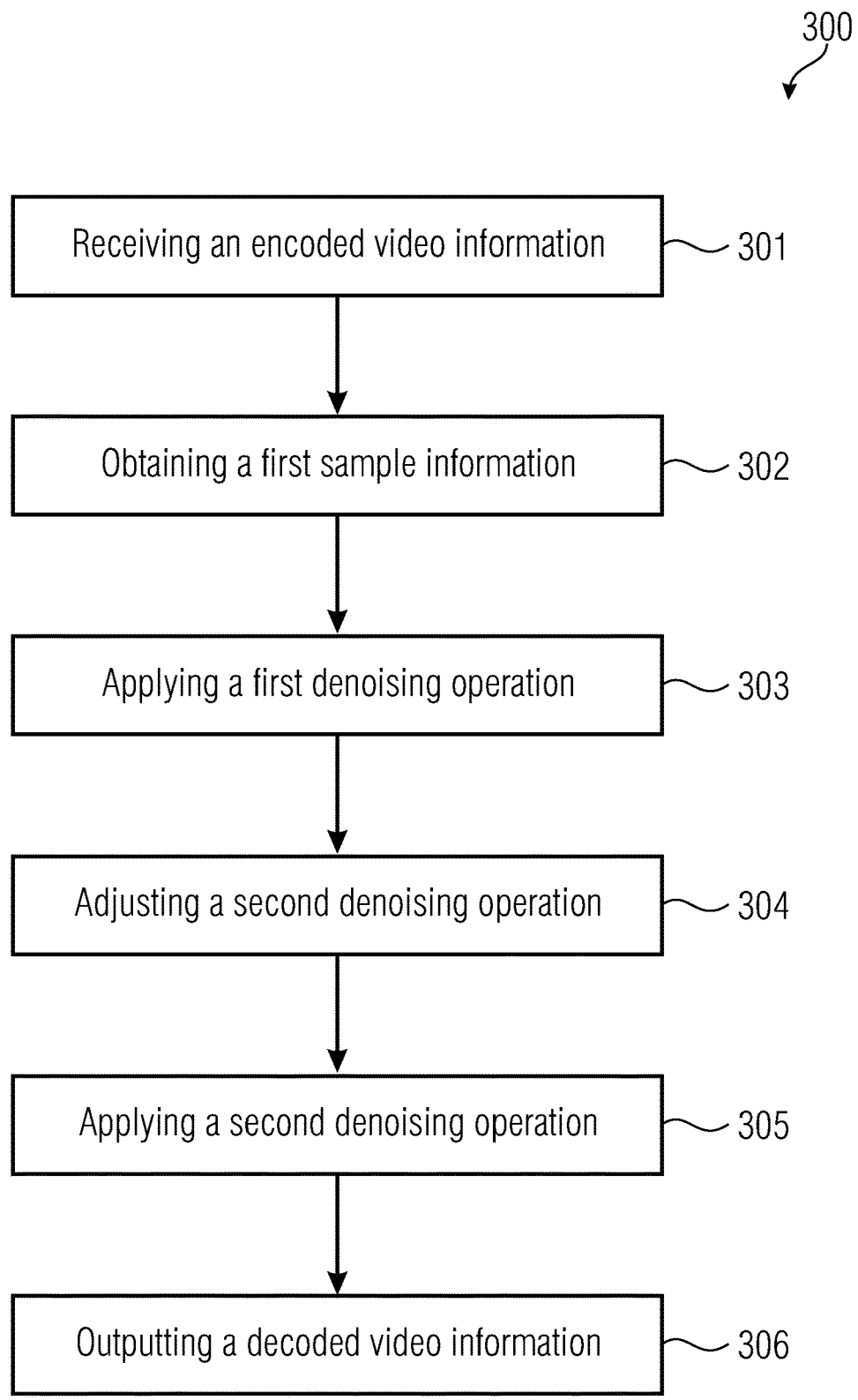
FIG. 3 shows a flow chart of a method 300 of decoding in accordance with an embodiment.

A method 300 for providing a decoded video information on the basis of an encoded video information in accordance with an embodiment is shown in FIG. 3.

The method comprises receiving an encoded video information at step 301 and obtaining a first sample information at step 302 on the basis of the encoded video information, for example using an entropy decoding of a bitstream, an inverse quantization and an inverse transformation, and optionally using a prediction.

The method further comprises applying a first denoising operation (step 303), for example a noise reduction operation, in order to obtain a first denoised sample information on the basis of the first sample information.

The method 300 further comprises applying a second denoising operation at step 305 on the basis of a result of the first denoising operation in order to obtain the decoded information. The obtained decoded video information is outputted at step 306.

The method further comprises adjusting (step 304, or for example adapting, the second denoising operation before applying the second denoising operation at step 305 in dependence on differences between samples before the first denoising operation and after the first denoising operation in order to obtain the decoded video information.

The method 300 may optionally be supplemented by any features, functionalities and details disclosed herein, both individually and taken in combination.

4. Method According to FIG. 4

Figure 4:
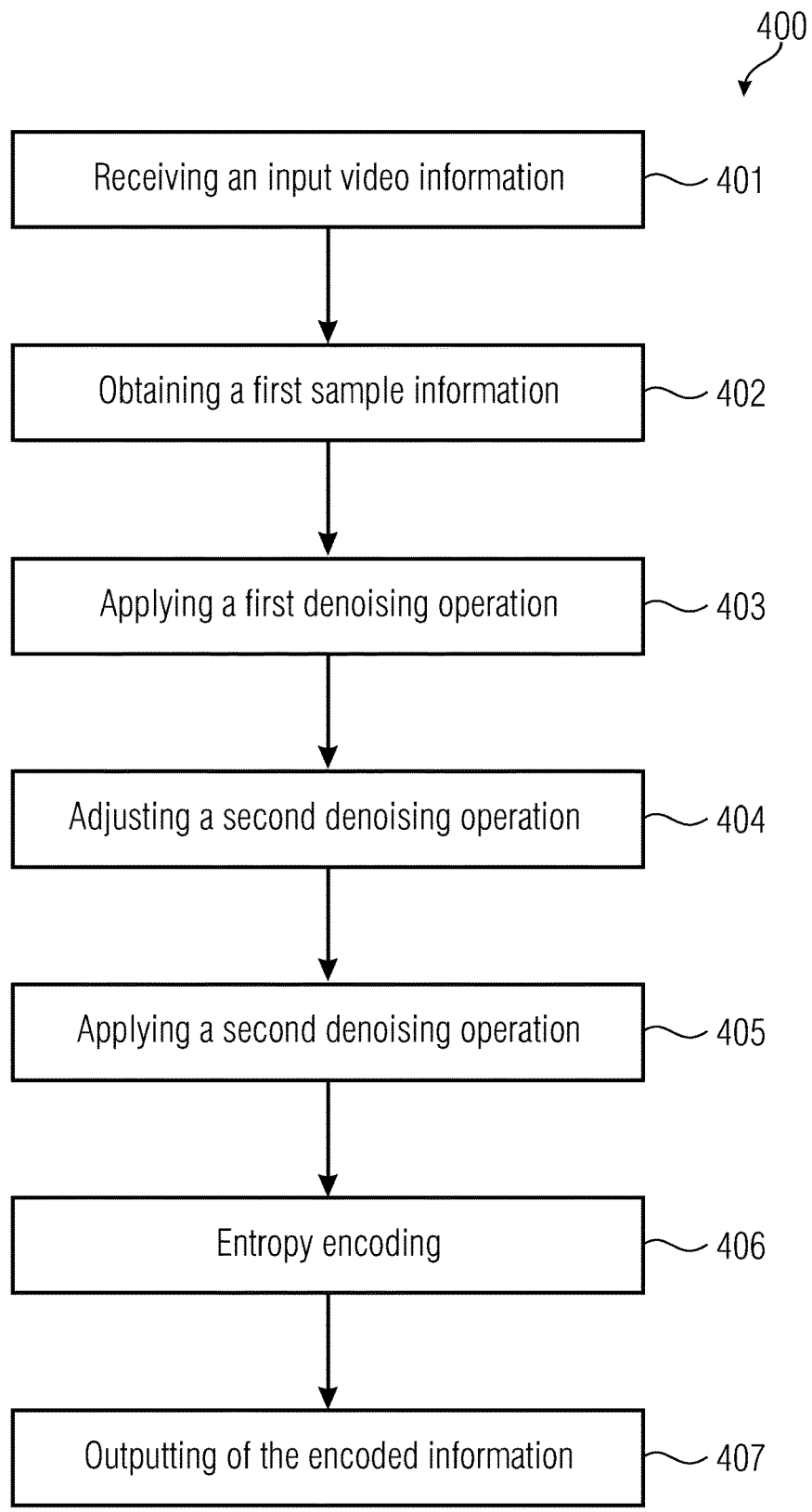
FIG. 4 shows a flow chart of a method 400 of encoding in accordance with an embodiment.

A method 400 for providing an encoded video information on the basis of an input video information in accordance with an embodiment is shown in FIG. 4.

The method 400 comprises receiving an input video information at step 401 and obtaining a first sample information at step 402 on the basis of the input video information, for example using a transformation, a quantization, an inverse quantization and an inverse transformation, and optionally using a prediction.

The method further comprises applying a first denoising operation (step 403), for example a noise reduction operation, in order to obtain a first denoised sample information on the basis of the first sample information.

The method 400 further comprises applying a second denoising operation at step 405 on the basis of a result of the first denoising operation. The method further comprises adjusting (step 404), or for example adapting, the second denoising operation prior to applying the second denoising operation in dependence on differences between samples before the first denoising operation and after the first denoising operation.

Operations of 402-405 of the method 400 basically represent a simulation of the decoder operations within an encoding method. The output of the second denoising operation is considered upon performing lossless encoding operations (e.g an entropy encoding) which are performed such that no information loss happens upon corresponding decoding (e.g. entropy decoding) of the encoded video information.

The entropy encoding step 406 is further performed in order to obtain the encoded information.

The obtained encoded video information is outputted at step 406.

The method 400 may optionally be supplemented by any features, functionalities and details disclosed herein, both individually and taken in combination.

5. Video Decoder According to FIG. 5

Figure 5:
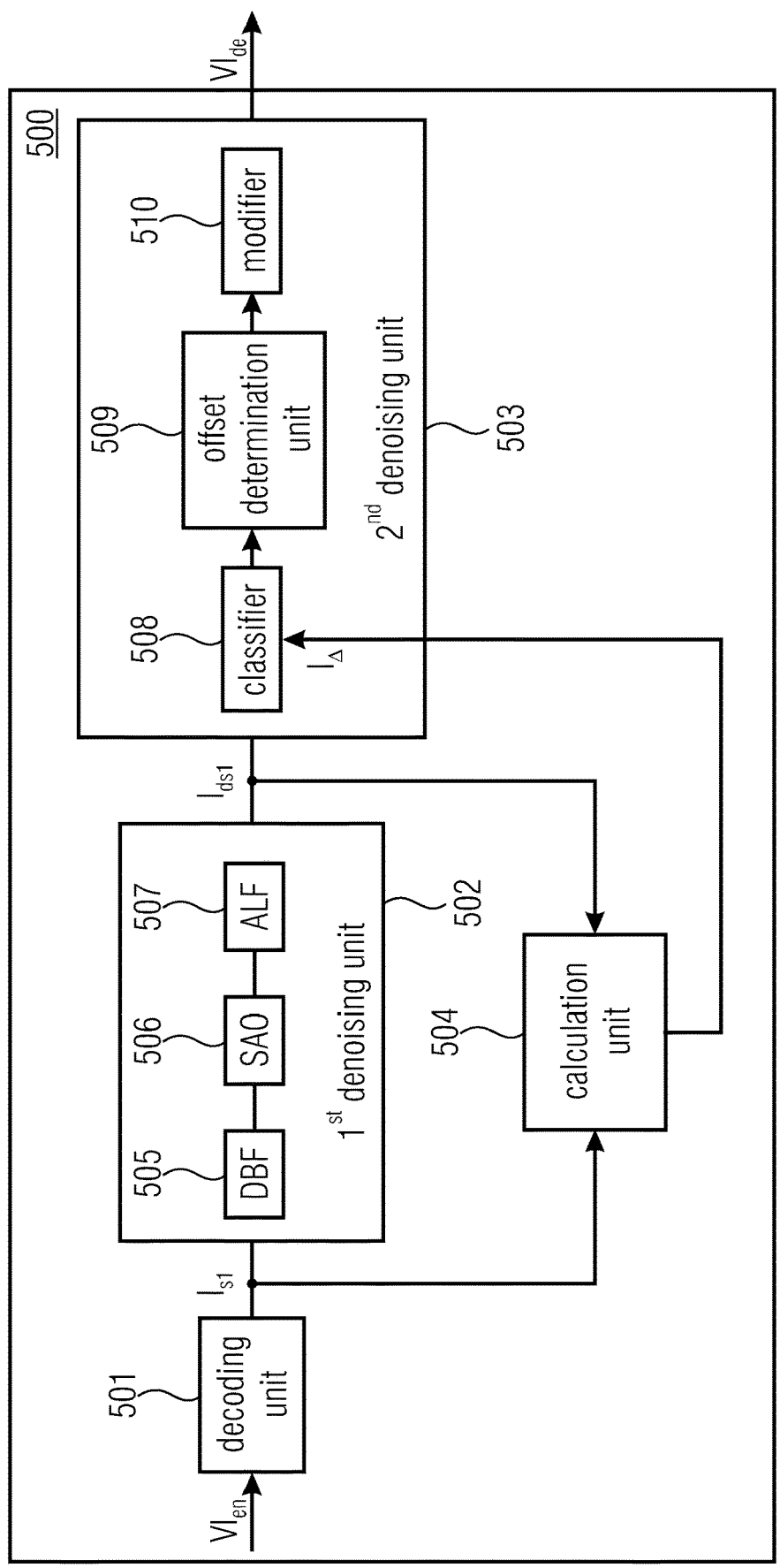
FIG. 5 shows a block diagram of a decoder 500 in accordance with an embodiment.

A video decoder 500 in accordance with an embodiment is presented in FIG. 5.

The video decoder 500 receives an encoded video information, shown as a video input or a video signal $VI_{en}$. A decoding unit 501 of the video decoder 500 obtains a first sample information $I_{s1}$ on the basis of the encoded video information.

A first denoising unit 502 performs a first denoising operation to reduce the noise and to obtain a first denoised sample information $I_{ds1}$ based on the first sample information $I_{s1}$. The first denoising unit 502 includes a DBF filter 505 and a SAO filter 506 and an ALF filter 507.

The second denoising unit 503 applies a second denoising operation on the basis of a result of the first denoising operation in order to obtain the decoded video information which is output from the video decoder 500. The second denoising unit 504 includes a classifier 508 which is configured to classify samples into a plurality of classes of samples in dependence on the difference $I_\Delta$ between (e.g. corresponding) samples before the first denoising operation and after the first denoising operation, the offset determination unit 509 which is configured to determine an offset based on the classification performed by the classifier 508, and a modifier 510 which is configured to modify samples in dependence of the classification performed by the classifier 508, namely, by adding the offset determined by the offset determination unit 509. The classification is, for example, performed by the classifier only when one or more of the predetermined threshold values is reached. The indicated differences are determined by a calculation unit 504.

The second denoising unit 503 is further configured to adjust the second denoising operation, in dependence on differences between samples before the first denoising operation and after the first denoising operation, in order to obtain the decoded video information.

The video decoder 500 may optionally be supplemented by any features, functionalities and details disclosed herein, both individually and taken in combination.

6. Further Embodiments and Aspects (e.g. Using a Post Sample Adaptive Offset (PSAO))

In the following, further aspects and embodiments according to the invention will be described, which can be used individually or in combination with any other embodiments disclosed herein.

Moreover, the embodiments disclosed in this section may optionally be supplemented by any other features, functionalities and details disclosed herein, both individually and taken in combination.

For example, a post Sample Adaptive Offset (PSAO) operation which could be used as a second denoising operation (e.g in the other embodiments disclosed herein) and its implementation in the decoder and the encoder in accordance with an embodiment is illustrated further.

6.1. Introduction

As described in the background section above, in video coding, the in-loop filter has emerged as a key module due to its significant improvement on compression performance.

The first in-loop filter adopted into video coding standards is deblocking filter (DBF) to mainly reduce blocking arti-facts [1]. HEVC further adopts another nonlinear in-loop filter, sample adaptive offset (SAO) [2], to further reduce the coding artifacts after DBF. Finally, Adaptive loop filter (ALF) [3], the final filtering procedure in the in-loop filter, has been adopted to the preliminary draft of VVC [4]. In particular, the sample adaptive offset (SAO) is a process that modifies the decoded samples by conditionally adding an offset value to each sample after the application of the deblocking filter (DBF). To conditionally add an offset value to each sample, a classification C is applied for each sample location and an offset value is selected for each group of sample locations sharing the same class index associated with C.

In accordance with this embodiment, an additional SAO filtering process, Post Sample Adaptive Offset (PSAO) with a new classification is suggested in order to obtain additional coding efficiency.

For example, PSAO (or the PSAO operation) as disclosed herein can optionally be used in combination with any of the concepts and technologies described herein, like an in-loop filter comprising one or more out of DBF, SAO and ALF (or the DBF, SAO and ALF operations).

6.2. Sample Adaptive Offset

The basic idea of the SAO is to add an offset value $d_l$ to, for example, each reconstructed sample $y(i)$ depending on class index $l=1, \ldots, L$ for a plurality of sample locations or for each sample location $i \in I$. For this, a classification C is, for example, applied for all sample locations $i \in I$. This nonlinear filtering process can be then written, for example, as $$\hat{y} = \sum_{l=0}^{L} \chi \Lambda_l \cdot (y + d_l) \quad (1)$$

where $\chi \Lambda_l$ is the indicator function defined, for example, by $$\chi \Lambda_l(i) = \begin{cases} 1 & i \in \Lambda_l \\ 0 & i \notin \Lambda_l \end{cases} \quad (2)$$

and $$\Lambda_l = \{i \in I : C(i) = l\}.$$

The offset value $d_l$ is, for example, chosen so that the mean square error associated with a class $\Lambda_l$ $$\sum_{i \in \Lambda_l} |x(i) - (y(i) + d_l)|^2$$

is minimized. This is given, for example, as follows:

$$d_l = \frac{1}{\#(\Lambda_l)} \sum_{i \in \Lambda_l} (x(i) - y(i)) \quad (3)$$

where x is the original image. It can be shown that an optimal classification $\tilde{C}$ for (1)-(2) with L=2 is given, for example, as $$\tilde{\Lambda}_1 = \{i \in I : (x(i) - y(i)) > 0\} \quad (4)$$

and $$\tilde{\Lambda}_2 = \{i \in I : (x(i) - y(i)) < 0\}$$

and $$\tilde{\Lambda}_0 = I \cap (\Lambda_1 \cup \Lambda_2)^c.$$

under some mild conditions.

The sample adaptive offset technique as described herein may optionally be introduced into any of the other embodiments described herein. For example, the sample adaptive offset techniques described here may, for example, be used in the first denoising unit 102 and/or in the second denoising unit 103 of the decoder 100 and/or in the first denoising unit 202 and/or in the second denoising unit 203 of the encoder 200 and/or in the first denoising operation 303 and/or in the second denoising operation 305 of the decoding method 300 and/or in the first denoising operation 403 and/or in the second denoising operation 405 of the encoding method 400 and/or in the first denoising unit 502 as, for example, a SAO filter 506 and/or in the second denoising unit 503 of the decoder 500.

6.3. Classification for the PSAO

In the following an example of a classification for PSAO will be described, wherein it should be noted that any details are optional.

PSAO (or the PSAO operation) (which may, for example, take the role of the second denoising operation, or which may, for example, be part of the second denoising operation) is, for example, given as (1) above, for example, with L=2 and it is applied, for example, after three in-loop filtering processes, for example, DBF, SAO and ALF in accordance with this description. The PSAO or PSAO operation, which is, for example, the second denoising operation, is, for example, basically secondary SAO filtering process. In this case, the input image y in (1) is, for example, a reconstructed image after the ALF or ALF operation is applied (for example, as a first denoising operation or as the first denoising operation disclosed herein). From (4), it is seen that an ideal classification can, for example, be given as the sign of x(i)−y(i). Since the original image x is not available at the decoder, for example, y2−y1 is taken instead of x−y. For example, two classes $\Lambda_1$ and $\Lambda_2$ are then constructed by taking the sign of y2−y1 when |y2−y1| is, for example, sufficiently large to approximate the ideal classification in (4). Here, the two images $y_1$ and $y_2$ are reconstructed image before in-loop filter (for example, before applying an in-loop filter, for example, the first denoising operation) and one (e.g. a reconstructed image or filtered reconstructed image) after SAO (e.g. after applying the SAO operation, for example, the second denoising operation) respectively.

Figure 6:
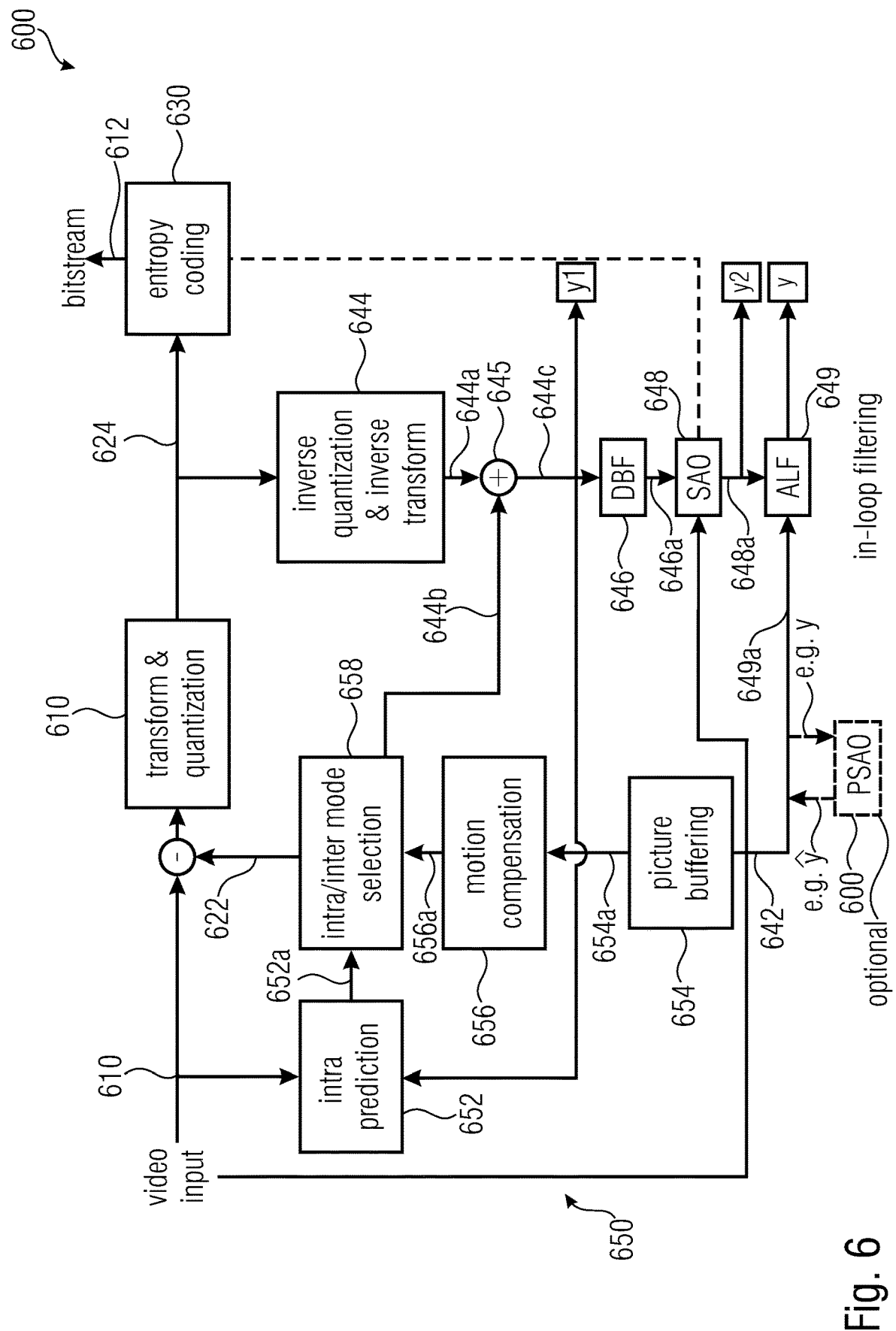
FIG. 6 shows a block diagram of an encoder where the PSAO operation is used as a second denoising operation in accordance with an embodiment.

This is illustrated, for example, in FIG. 6, showing an encoder in accordance with this embodiment. However, it should be noted that the specific structure and details shown in FIG. 6 should be considered as an example only, and are not essential for the concept disclosed herein. FIG. 6 shows an encoder block diagram, where unfiltered and filtered (denoised) images are defined as y1 and y2.

This gives, for example, $$\hat{y} = \sum_{l=0}^{2} X \Lambda_l \cdot (y + Q(d_l)) \quad (5)$$

where, for example, $$\Lambda_1 = \{i \in I : (y_2(i) - y_1(i)) > T\} \quad (6)$$

and $$\Lambda_2 = \{i \in I : (y_2(i) - y_1(i)) < -T\}$$

and, for example, $$\Lambda_0 = I \cap (\Lambda_1 \cup \Lambda_2)^c$$

where T is, for example, some fixed positive constant (which may, optionally, be determined by the encoder and which may, for example, be signaled from the encoder to the decoder in an encoded video representation). Here, $Q(d_l)$ is, for example, a quantized value of $d_l$ for l=1, 2 (which may, optionally, be determined by the encoder and which may, for example, be signaled from the encoder to the decoder in an encoded video representation). For the offset values $d_l$, we apply, for example, (3) for l=1, 2 and, for example, simply take $d_0$=0 (e.g. for a determination in the encoder, wherein, for example, $y_2$ or $y_2(i)$ may take the place of y in equation (3)).

Figure 7:
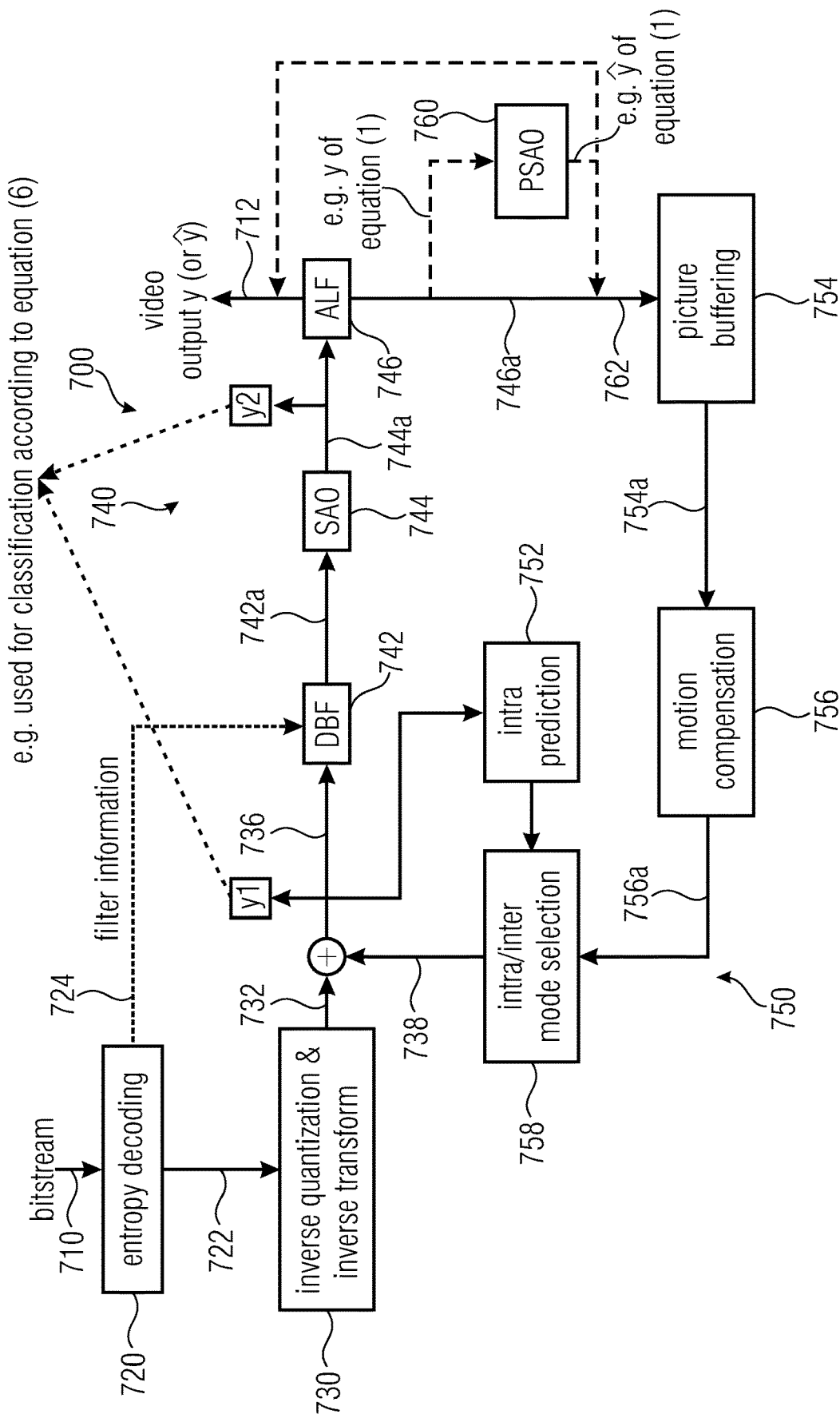
FIG. 7 shows a block diagram of a decoder where the PSAO operation is used as a second denoising operation in accordance with an embodiment.

It should be noted that the "Classification for PSAO" described here may, for example, be applied in the encoder 600 according to FIG. 6 or in the decoder 700 according to FIG. 7, or in any other encoders and decoders disclosed herein (e.g. in the second denoising unit 103 of the decoder 100 and/or in the second denoising unit 203 of the encoder 200 and/or in the block 304 (adjusting a second denoising operation) of the decoding method 300 and/or in the block 404 (adjusting a second denoising operation of the encoding method 400 and a classifier 508 of the second denoising unit 503 of the decoder 500).

6.4. Decoder

In the following, an example of a decoder, or of a (partial) functionality of a decoder will be described, wherein it should be noted that the decoder may, for example, use the above discussed "classification for PSAO". It should be noted that any details are optional.

After $\Lambda_1$ and $\Lambda_2$ are constructed, for example, by classification as defined in (6), (5) (or the operation (5)) is applied for the input image y (for example, a decoded image after the ALF or ALF operation). Unlike SAO (or the SAO operation) which performs (1) for each CTB, (5) (or the operation (5)) is applied, for example, once for each frame and this implies that, for example, only two quantized offset values $Q(d_1)$ and $Q(d_2)$ may be used for each frame. It should be noted that, for example, three parameters may be used for each frame, namely $Q(d_1)$, $Q(d_2)$ and FLAG parsed from the bitstream. FLAG is, for example, either 0 or 1, which determines whether PSAO (or the PSAO operation) is applied or skipped for y. It should be noted that, for example, if FLAG=1, PSAO (or the PSAO operation) is applied with $Q(d_1)$ and $Q(d_2)$ while it is skipped when FLAG=0. This whole process is applied, for example, for each of YUV components independently.

An example of a decoder, which may, for example, use the functionality described here, is shown in FIG. 7. FIG. 7 shows an decoder block diagram, where unfiltered and filtered (denoised) images are defined as y1 and y2.

6.5. Encoder

In the following, an example of an encoder, or of a (partial) functionality of an encoder will be described, wherein it should be noted that the encoder may, for example, use the above discussed "classification for PSAO". It should be noted that any details are optional.

After a classification in (6) is applied, offset values $d_1$ and $d_2$, for example, in (5) are derived, for example, by (3). Then, for example, the corresponding RD cost is calculated, for example, with quantized offset values $Q(d_1)$ and $Q(d_2)$ to assign either 0 or 1 for FLAG. For example, when FLAG=1, quantized offset values $Q(d_1)$ and $Q(d_2)$ are transmitted, otherwise only FLAG=0 transmitted—in this case PSAO (or the PSAO operation) is, for example, skipped at the decoder. This whole process is, for example, applied for each of YUV components independently.

6.6. Comments

In the following, some comments and details will be provided, which may optionally be considered or used in any of the embodiments disclosed herein.

According to an aspect, the main novelty (or at least one of the main novelties) of this approach (which may, for example, be applied in the encoders disclosed herein and in the decoders disclosed herein) is the new classification given, for example, in (6). Also, in case of applying SAO (or the SAO operation) in accordance with the embodiment, (1) is, for example, applied for each CTB (for example, for each coding tree block or coding tree unit) while PSAO performs, for example, (5) for each frame (for example, each of YUV components). For the PSAO, for example, only three parameters Q(d1), Q(d2) and FLAG are estimated, for example, for each YUV component at the encoder. Finally, the classification (6) can be generalized, for example, as follows:

$$\Lambda_1 = \{i \in I : f(i) > T\} \text{ and } \Lambda_2 = \{i \in I : f(i) < -T\}$$

where $$f(i) = \sum_{i \in N(i)} w(i-j) \cdot (y_2(j) - y_1(j))$$

and N(i) is a set of neighboring sample locations, for example, for $i=(i_1, i_2) \in I$ and $w(i-j)$ are, for example, some fixed positive weights. For instance, one may take $$N((i_1, i_2)) = \{(i_1, i_2), (i_1 - 1, i_2), (i_1 + 1, i_2), (i_1, i_2 - 1), (i_1, i_2 + 1)\}$$

and w(0,0)=4 and w(0,1)=w(1,0)=w(0,-1)=w(-1,0)=1. Also, one can, for example, simply take $N(i_1,i_2) \{(i_1,i_2)\}$ and w(0,0)=1, which gives (6).

Figure 8:
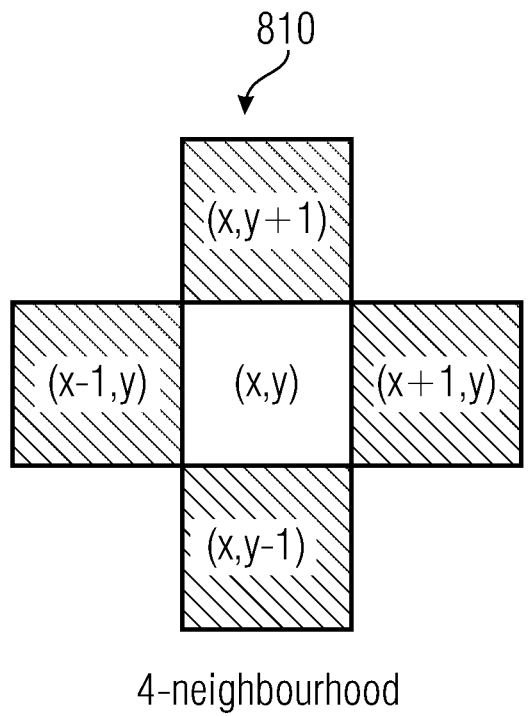
FIG. 8 shows examples of a local neighborhood in an embodiment under FIGS. 5 and 6.
Figure 8:
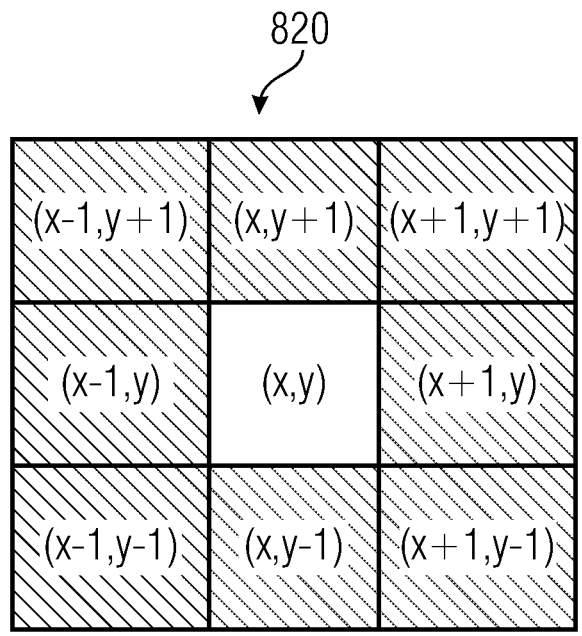

Some examples of the set of neighbouring sample locations N(i) in accordance with some embodiments are shown in FIG. 8, for example, for 4-neighbourhood and for 8-neighbourhood.

Figure 9:
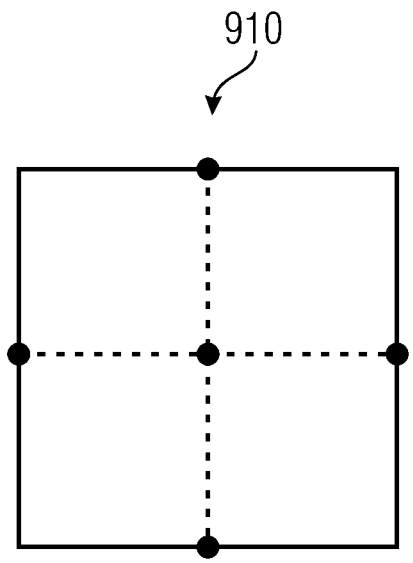
FIG. 9 shows examples of a local neighborhood in an embodiment under FIGS. 5 and 6.
Figure 9:
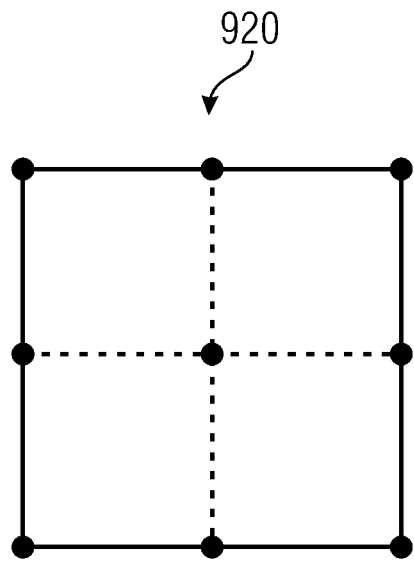

Further examples of local neighborhood $N((i_1,i_2))$ in accordance with further embodiments are illustrated in FIG. 9, particularly containing 5 samples (Left) and 9 samples (right).

7. Further Embodiments and Aspects (e.g. Using a Sample Adaptive Offset for Deblocking Filter (SAODBF))

In the following, further aspects and embodiments according to the invention will be described, which can be used individually or in combination with any other embodiments disclosed herein.

Moreover, the embodiments disclosed in this section may optionally be supplemented by any other features, functionalities and details disclosed herein, both individually and taken in combination.

A sample Adaptive Offset for Deblocking Filter (SAODBF) operation which could, for example, be used as a second denoising operation and its implementation in the decoder and the encoder in accordance with another embodiment is illustrated further.

7.1 Introduction

As described in the background section above, in video coding, the in-loop filter has emerged as a key module due to its significant improvement on compression performance. The first in-loop filter adopted into video coding standards is a deblocking filter (DBF) to mainly reduce blocking artifacts [1]. HEVC further adopts another nonlinear in-loop filter, e.g. a sample adaptive offset (SAO), to further reduce the coding artifacts after DBF [2].

As described above, a sample adaptive offset (SAO) is a process that modifies the decoded samples by conditionally adding an offset value to each sample after the application of the deblocking filter (DBF). To conditionally add an offset value to each sample, a classification C is applied for each sample location and an offset value is selected for each group of sample locations sharing the same class index associated with C. In this embodiment an additional SAO filtering is proposed, and SAODBF (or the SAODBF operation) is jointly applied with the deblocking filter (DBF), with a new classification to obtain additional coding efficiency.

7.2 Sample Adaptive Offset

The basic idea of the SAO is to add an offset value $d_l$ to each, for example, reconstructed sample Y(i) depending on the class index l=1, . . . , L for a plurality of sample locations or each sample location $i \in I$. For this, a classification C is, for example, applied for all sample locations $i \in I$. This nonlinear filtering process can be then written, for example, as $$\hat{y} = \sum_{l=0}^{L} X\Lambda_l \cdot (Y + Q(d_l)) \quad (1')$$

where $Q(d_l)$ are quantized values for offset coefficients $d_l$ and $X\Lambda_l$ is the indicator function defined, for example, by $$X\Lambda_l(i) = \begin{cases} 1 & i \in \Lambda_l \\ 0 & i \in \Lambda_l \end{cases} \quad (2')$$

and $$\Lambda_l = \{i \in I : C(i) = l\}$$

The offset value $d_l$ is, for example, chosen so that the mean square error associated with a class $\Lambda_l$ $$\sum_{i \in \Lambda_l} |X(i) - (Y(i) + d_l)|^2$$

is minimized. This is given, for example, as follows:

$$d_l = \frac{1}{\#(\Lambda_l)} \sum_{i \in \Lambda_l} (X(i) - Y(i)) \quad (3')$$

where X is the original image and $\#(\Lambda_l)$ is the number of elements in $\Lambda_l$.

The sample adaptive offset technique as described herein may optionally be introduced into any of the other embodiments described herein.

It should be noted that the "Classification for PSAO" described here may, for example, be applied in the encoder 600 according to FIG. 6 or in the decoder 700 according to FIG. 7, or in any other encoders and decoders disclosed herein (e.g. in the second denoising unit 103 of the decoder 100 and/or in the second denoising unit 203 of the encoder 200 and/or in the block 304 (adjusting a second denoising operation) of the decoding method 300 and/or in the block 404 (adjusting a second denoising operation of the encoding method 400 and a classifier 508 of the second denoising unit 503 of the decoder 500)).

7.3. Sample Adaptive Offset for Deblocking Filter (SAODBF)

In this embodiment (or, generally speaking, in section 7) two approaches for sample adaptive offset for deblocking filter (SAODBF) are proposed (which may, optionally, be used in any of the embodiments disclosed herein).

Figure 10:
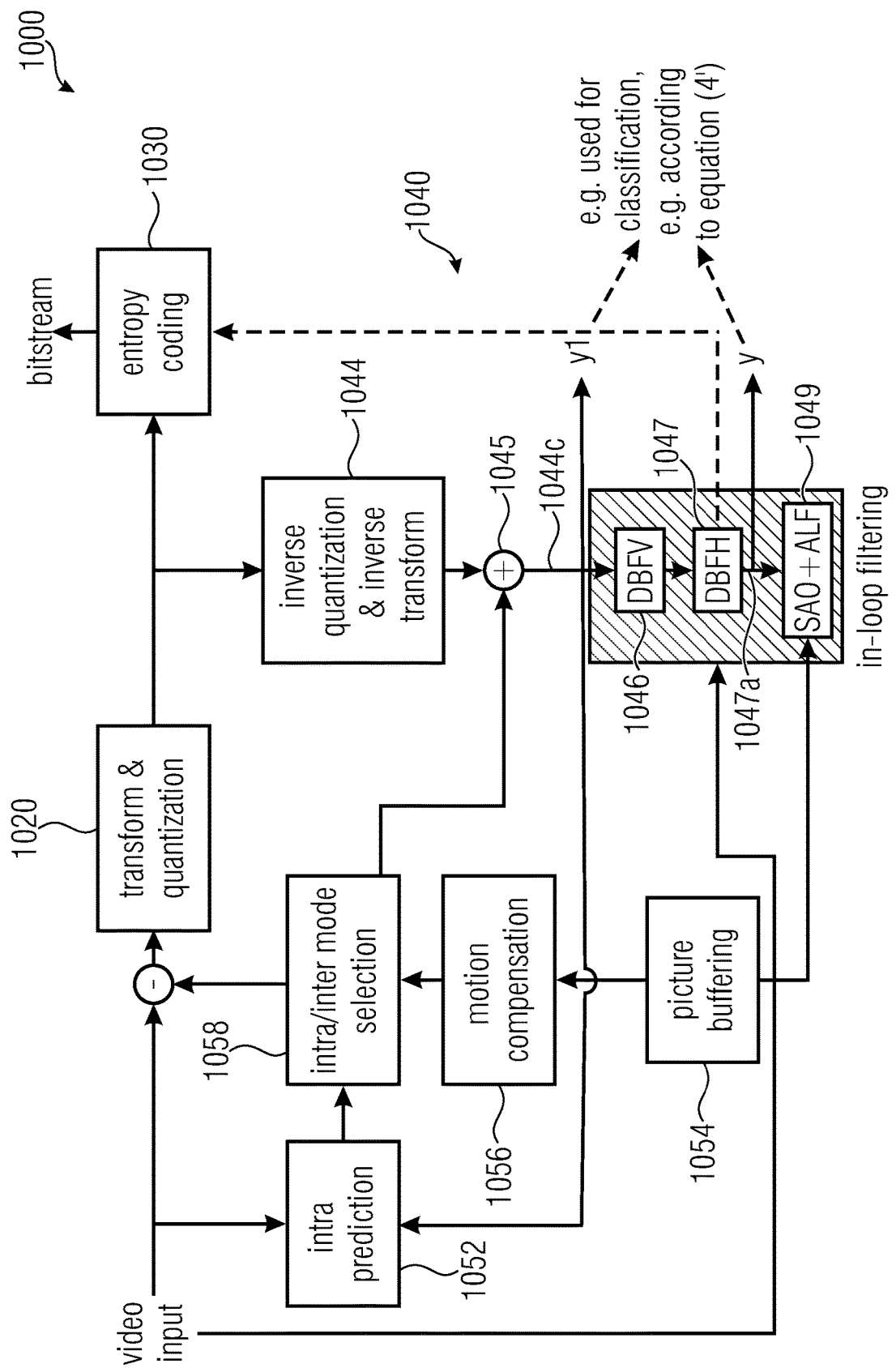
FIG. 10 shows a block diagram of an encoder where the SAODBF operation is used as a second denoising operation in accordance with an embodiment.

The two operations are applied, for example, right after DBF (or the DBF operation) before, for example, SAO (or the SAO operation) is applied and they are additional SAO filterings. Herein and after, these two operations are defined as SAODBF1 and SAODBF2. These two operations follow the same procedure as provided in (1)'-(3)' in the conventional SAO (or the conventional SAO operation) with new classifications to construct classes $\Lambda_l$ in (2)' or (2). Finally, it is noted that DBF (or the DBF operation) consists of, for example, two filtering processes, for example, one for the vertical edges and the other, for example, for the horizontal edges which are defined as DBFV (or the DBFV operation) and DBFH (or the DBFH operation) respectively, as could be seen in FIG. 10 illustrating an encoder in accordance with this embodiment. FIG. 10 shows an encoder block diagram, where unfiltered and filtered images are defined as $Y_1$ and Y.

7.3.1 SAODBF1

In this section, a classification in SAODBF1 (or the SAODBF1 operation) is described. For this purpose, $T_0, \ldots, T_L$ are, for example, some positive constants with $T_0 < \ldots < T_L$, and $T_L = \infty$. $Y_1$ and Y are, for example, a noisy image, for example, before DBF is applied and a denoised image after DBF respectively, for example as shown in FIG. 10. Classes for SAODBF1 are then defined, for example, as $$\Lambda_l = \{i \in I : T_{l-1} \leq \{Y_1(i) - Y(i)\} < T_l\} \text{ and} \quad (4')$$

$$\Lambda_{l+L} = \{i \in I : T_{l-1} \leq \{Y(i) - Y_1(i)\} < T_l\}$$

for $l = 1, \ldots, L$ and $$\Lambda_0 = I \cap (\Lambda_1 \cup \ldots \cup \Lambda_{2L})^c$$

SAODBF1 (or the SAODBF1 operation) is then given as (1)' with the classes $\Lambda_l$ in (4)' and this can be written, for example, as $$\hat{Y} = \sum_{l=0}^{2L} X \Lambda_l \cdot (Y + Q(d_l)) \quad (5')$$

where $Q(d_l)$ are, for example, quantized values of offset coefficients $d_l$ derived as, for example, (3)' and $d_0$ is let to be $d0=0$.

7.3.1.1 Decoder

In the following, an example of a decoder, or of a (partial) functionality of a decoder will be described, wherein it should be noted that the decoder may, for example, use the above discussed "classification for PSAO". It should be noted that any details are optional.

After $\Lambda_1 \ldots \Lambda_{2L}$ are constructed, for example, by classification in (4)', (5)' is applied for the input image $Y_2$ (decoded image after DBF (or the DBF operation)). Unlike SAO (or the SAO operation) which performs (1)' for each CTU, (5)' is applied, for example, once for each frame and this implies that, for example, only 2L quantized offset values $Q(d_1) \ldots Q(d_{2L})$ with $d_0=0$ may be used for each frame. It is noted that, for example, 2L+1 parameters may be used for each frame, namely $Q(d_1) \ldots Q(d_{2L})$ and flag parsed from the bitstream. flag, for example, is either 0 or 1, which determines whether SAODBF1 (or the SAODBF1 operation) is applied or skipped for $Y_2$. It is noted, for example, if flag=1, SAODBF1 (or the SAODBF1 operation) is applied while it is skipped when flag=0. This whole process can be applied, for example, for each of YUV components independently.

7.3.1.2 Encoder

In the following, an example of an encoder, or of a (partial) functionality of an encoder will be described, wherein it should be noted that the encoder may, for example, use the above discussed "classification for PSAO". It should be noted that any details are optional.

After a classification in (4)' is applied, offset values $d_1 \ldots d_{2L}$ in (5)' are derived, for example, by (3)'. Then the corresponding RD cost is calculated with, for example, quantized offset values $Q(d_1) \ldots Q(d_{2L})$ to assign either 0 or 1 for flag. When flag=1, quantized offset values $Q(d_1) \ldots Q(d_{2L})$ are transmitted, otherwise only flag=0 is transmitted and in this case SAODBF1 (or the SAODBF1 operation) is skipped, for example, at the decoder. This whole process is applied, for example, for each of YUV components, for example, independently.

7.3.2 SAODBF2

In this approach, for example, additional SAO (or an additional SAO operation) is applied with the same procedure as (4)'-(5)' twice. The two additional SAO (or SAO operations) are defined as SAOV and SAOH (or SAOV and SAOH operations). SAOV (or the SAOV operation) is applied, for example, after DBFV (or the DBFV operation) and it takes $Y_2$ (output of DBFV (or the DBFV operation)) as, for example, the input image. SAOV (or the SAOV operation) takes difference between for example $Y_1$ (image before DBF (or the DBF operation)) and $Y_2$ for (4)'. On the other hand, SAOH (or the SAOH operation) is applied for example after DBFH (or the DBFH operation) and it takes for example $Y_3$ (output of DBFH (or the DBFH operation)) as the input image. SAOH (or the SAOH operation) takes difference between, for example, $\hat{Y}_2$ (output of SAOV (or the SAOV operation)) and $Y_3$ for (4)'. This is illustrated, for example, in FIG. 11.

7.4 Some Comments

Like the conventional SAO, the proposed additional SAO filterings, SAOBDF1 and SAOBDF2 can be applied for example for each CTU rather than for example for the whole picture frame. In this case, offset values $d_l$ and flag parameter should be transmitted for each CTU. Also, the threshold parameters $T_0, \ldots T_{L-1}$ can be, for example, determined (for example, chosen by experiments) or can be determined, for example, at encoder, such as the encoder selects, for example, the best set of threshold parameters $T_0, \ldots T_{L-1}$ among, for example, some pre-selected candidate sets based on, for example, RD cost and the selected choice should be then transmitted, for example, for each picture frame (or, for example, for each CTU).

In one embodiment the additional SAO, for example PSAO, is applied for example, after ALF while it is applied after for example DBF (or for example either after DBFV or DBFH) according to another embodiment.

In one embodiment there is, for example, only one threshold parameter T and for example three classes $\Lambda_0$, $\Lambda_1$, $\Lambda_2$ while according to another embodiment there are for example L threshold parameters $T_0, \ldots T_{L-1}$ and for example 2L+1 classes $\Lambda_0, \ldots \Lambda_{2L+1}$, or 2L+1 classes $\Lambda_0, \ldots \Lambda_{2L}$.

For an alternative approach SAODBF2, indicated additional SAO is applied for example twice (a first one for example after DBFV and a second one, for example, after DBFH) while it is applied for example once after ALF in another embodiment.

REFERENCES

[1] P. List, A. Joch, J. Lainema, G. Bjontegaard, and M. Karczewicz, *Adaptive deblocking filter*, IEEE Trans. Circuits Syst. Video Technol. 13 (2003), No. 7.
[2] C.-M. Fu et al., *Sample adaptive offset in the HEVC standard*, IEEE Trans. Circuits Syst. Video Technol. 22 (2012) No. 12.
[3] Karczewicz, M.; Zhang, L.; Chien, W.; Li, X.: Geometry transformation-based adaptive in-loop filter, in *Picture Coding Symposium* (PCS), Nuremberg, Germany, 2016.
[4] Bross, B.; Chen, J.; Liu, S.: Versatile Video Coding (Draft 4), JVET-M1001, Marrakech, Marocco, January 2019.

8. Embodiment According to FIG. 6

FIG. 6 shows a block schematic diagram of an encoder, according to an embodiment of the present invention. The video encoder 600 is configured to receive a video input 610 and to provide, on the basis thereof, a bitstream 612, which represents the video input in an encoded form.

The video encoder 600 comprises a transform and quantization 620, which transforms and quantizes, for example, sample values of the video input 610, or a difference between sample values of the video input 610 and predicted sample values 622. For example, in some circumstances, no prediction may be used (for example, when an independent frame is encoded), while under other circumstances, such a prediction may be applied. For example, the transform and quantization 620 may provide quantize transform coefficients 624, which represent pixel values of the video input 610, or pixel values of a difference between the video input 610 and the prediction result 622. An entropy coding 630 may, for example, encode the quantized transform coefficients 624 (as well as an additional control information), to thereby obtain the bitstream 612.

The video encoder 600 also comprises a reconstruction path 640, in which a reconstructed image information 642 is derived from the quantized transform coefficients 624. For example, the reconstruction path 640 "simulates" a decoder-sided reconstruction, such that the video encoder 600 can gain knowledge which image information an video decoder would have available, for example, for a motion compensation, which may, for example, be performed in the context of an inter-frame prediction (for example, both using a prediction on the basis of a previous frame and a bidirectional prediction using both a preceding frame and a subsequent frame). Moreover, the video encoder also comprises a prediction mechanism 650, which may, for example, be able to perform both an intra-prediction (e.g., a prediction within a single frame) and an inter-frame prediction.

In the following, some additional details regarding the reconstruction path 640 will be described. For example, the reconstruction path 640 comprises an inverse quantization and inverse transform 644, which receives the quantized transform coefficient 624 and provides, on the basis thereof, reconstructed image information 644a, for example, in the form of spectral values. Optionally, predicted image information (e.g., predicted spectral values) 644b, which are provided by the prediction path 650 are added by the prediction addition 645, e.g., to the reconstructed image information 644a, to thereby obtain a partially reconstructed image information 644c, which may also be designated with $y_1$ herein.

The partially reconstructed image information 644c is then input into a deblocking filter (DBF) 646, which provides a deblocking-filtered image information 646a. The reconstruction path 640 also comprises a sample adaptive offset (SAO) processing 648, which receives the deblocking-filtered image information 646a (e.g., a block or frame of spectral values) and performs a sample adaptive offset (SAO) processing. Accordingly, sample-adaptive-offset-processed image information 648a is provided, which is also designated with $y_2$. Furthermore, the reconstruction path 640 also comprises an adaptive loop filter (ALF) 649, which receives the same-adaptive-offset-processed image information 648a and provides, on the basis thereof, adaptive-loop-filtering processed image information 649a, which may, for example, form the reconstructed image information 642 (e.g., reconstructed pixel values) and which may, for example, be designated with y.

The prediction path 650 comprises an intra prediction 652 which may, for example, receive the video input 610 and the partially reconstructed image information 644c and which may, for example, provide an intra prediction information 652a. Moreover, the prediction path 650 may comprise a picture buffering 654, which may, for example, receive the reconstructed image information 642 (for example, the information designated with y) and which may, for example, buffer said reconstructed image information 642 for later usage. The buffered image information is designated with 654a. The video encoder 600 also comprises a motion compensation 656, which may, for example, receive the buffered image information 654a (for example, a block or frame of pixel values) and may determine a motion compensation information 656a. For example, the motion compensation information 656a may comprise motion vector information, wherein the motion vector information may describe movement of image portions between subsequent frames.

Moreover, the video encoder 600 may comprise an intra/inter mode selection 658, which may, for example, decide between an intra prediction and an inter prediction (or inter-frame prediction). The intra/inter mode selection 658 may, for example, provide an appropriate prediction information 622 (for example, a predicted image information 622), which may, for example, be subtracted from the video input 610. In addition, the intra/inter mode selection 658 may also provide the predicted image information 644b, which may, for example, be added to the partially reconstructed image information 644a, to thereby obtain reconstructed image information 644c, in which the prediction is considered.

To conclude, the video encoder 600 may entropy code quantized transform coefficients associated with a video content, wherein the transform coefficients may be based on the original video input 610, or on a prediction-processed version of the video input, where prediction results are already subtracted from the video input 610 to thereby reduce a bit rate. The reconstruction path 640 may simulate a decoder-sided processing, for example, to have a same basis for the prediction both on the encoder side and the decoder side (which helps to keep the encoder and the decoder in synchronization).

Within the reconstruction path 640, there are different filtering operations, like the deblocking filtering (DBF) 646, the sample adaptive offset (SAO) processing 648 and the adaptive loop filtering (ALF) 649.

It should be noted that the deblocking filter (DBF) operation 646, the sample adaptive offset (SAO) processing operation 648 and the adaptive loop filter (ALF) operation 649 may all be considered as denoising operations. However, it should be noted that the deblocking filtering (DBF) 646 and the sample adaptive offset (SAO) 648 may, for example, be considered as a "first denoising operation" and that the adaptive loop filtering (ALF) 649 may, for example, be considered as a "second denoising operation". Moreover, it should be noted that adaptive loop filtering (ALF) 649 may, for example, be adaptive in dependence on the difference between the output of the first denoising operation (e.g., $y_2$) and the input of the first denoising operation (e.g., $y_1$).

In an advantageous embodiment, the post sample adaptive offset PSAO, which is described, for example, in section 6 is added after the adaptive loop filter (ALF) 649. For example, a process image information 649a, which is provided by the adaptive loop filter (ALF) 649, and which is, for example, designated with y is input into the post sample adaptive offset processing (PSAO) 660, which should be considered as being optional. In other words, an image information provided by the adaptive loop filtering (ALF) 649, which is designated, for example, with 649a or y, is input into the post sample adaptive offset (PSAO) processing 660, and output result of the post sample adaptive offset (PSAO) processing 660 may constitute the reconstructed image information 642 which is input into the prediction path 650. Accordingly, the post sample adaptive offset (PSAO) 660 may, for example, be adapted in accordance with the difference between the sample adapted offset (PSAO) processed image information 648a (also designated with $y_2$) and the image information 644c which is input into the deblocking filter (DBF) 646. However, this difference $y_2-y_1$ may, for example, be considered as a difference between samples before the first denoising operation (which may, for example, comprise a deblocking filter (DBF) 646 and the sample adaptive offset (SAO) processing 648) and after the first denoising operation. For example, said difference $y_2-y_1$ (e.g., the difference between corresponding pixel values of the image information 648a and the image information 644c) may be used for the classification, which may be performed, for example, according to equation (4), wherein x is replaced by $y_1$ and wherein y is replaced by $y_2$. Moreover, it should be noted that the optional post sample adaptive offset (PSAO) processing 660 may, for example, perform a processing as provided by equation (5), e.g., selectively add an offset values $Q(d_l)$ to the output 649a of the adaptive loop filtering (ALF) 649. In this respect, a pixel value of the image information 649a provided by the adaptive loop filtering (ALF) 649 may take the place of y in equation (5), and the output information of the post sample adaptive offset (PSAO) processing 660 (e.g., the reconstructed image information 642) may be represented by the pixel value y shown in equation (5).

To conclude, the (optional) post sample adaptive offset (PSAO) processing 660 may provide improved reconstructed image information 642, and the classification of pixels, which is performed in the context of the post sample adaptive offset (PSAO) processing 660 is based on the difference between pixel values $y_2$ and $y_1$. Consequently, the strength of the modification of one or more pixel values provided by the first denoising operation (e.g., by the deblocking filter (DBF) operation 646 and the sample adaptive offset (SAO) processing 648) may have an impact on (or even determine) the classification, and may consequently effect an offset introduced by the post sample adaptive offset (PSAO) processing 660. Accordingly, the offset introduced by the post sample adaptive (PSAO) processing 660 may, for example, have a correlation with the difference between $y_2$ and $y_1$.

However, it should be noted that the video encoder 600 according to FIG. 6 may optionally be supplemented by any of the features, functionalities and details described herein, both individually and taken in combination. Moreover, it should be noted that any of the explanations provided with respect to the video encoder 600 may optionally also apply to any of the other embodiments.

9. Embodiment According to FIG. 7

FIG. 7 shows a block schematic diagram of a video decoder, according to an embodiment of the invention. A video decoder according to FIG. 7 is designated in its entirety with 700. The video decoder 700 is configured to receive a video stream 710, which may, for example, correspond to the bitstream 612 provided by the video encoder 600. Moreover, the video decoder 700 is configured to provide a video output 712, for example, a representation of pixel values. The video decoder 700 comprises an entropy decoding 720, which receives the bitstream 710, and which may, for example, decode transform coefficients and, optionally, additional parameters (like, for example, quantized values $d_l$) which has been entropy coded, for example, by the entropy coding 630. Insofar, the entropy decoding 720 may, for example, correspond to the entropy coding 630.

Accordingly, the entropy decoding 720 provides decoded (quantized) transform coefficients 722. In addition, the entropy decoding 720 may provide a decoded filter information 724, which may, for example, comprise parameters for a deblocking filtering (DBF), for a sample adaptive offset (SAO) processing and/or for a post sample adaptive offset (PSAO) processing. The parameters (or filter information) 724 provided by the entropy decoding 720 may, for example, correspond to parameters used by the deblocking filter (DBF) 646 and/or by the sample adaptive offset (SAO) processing 648 and/or by the adaptive loop filtering (ALF) 649 and/or by the post sample adaptive offset (PSAO) processing 660 in the video encoder 600 (wherein it should be noted that such parameters may, for example, be entropy coded by the entropy coding 630). Moreover, the video decoder 700 also comprises an inverse quantization and an inverse transform 730 which may, for example, at least partially reverse the transform and quantization performed by the block 620 of the video encoder 600. For example, the inverse quantization and inverse transform 730 may correspond to the inverse quantization and inverse transform 644 of the video encoder 600.

The video decoder 700 also comprises a plurality of denoising operations or denoising blocks, which together form a denoising chain 740 which may, for example, provide the reconstructed video representation 712. Moreover, the video decoder 700 also comprises a prediction 750, which may, for example, correspond to the prediction 650 of the video encoder 600.

The processing chain 740 may, for example, receive partly reconstructed image information 732 provided by the inverse quantization and inverse transform 730, or a prediction-processed, partially reconstructed image information 736, and which a prediction result 738, which is provided by the prediction processing 750, and added to the partially reconstructed image information 732 provided by the inverse quantization and inverse transform 730. The input information which is input into the denoising processing 740 is designated, for example, with $y_1$, and may be equal to the partially reconstructed image information 732 in the absence of a prediction or may be equal to the prediction process partially reconstructed image information 736 in the presence of a prediction.

The processing path 740 (which may be considered as a denoising processing path or as a post processing path) may, for example, comprise a deblocking filter (DBF) 742 which provides a deblocking-filtered image information 742a on the basis of the input information of the processing path 740 (e.g., the image information $y_1$) and may also comprise a sample adaptive offset (SAO) processing 744, which provides a sample-adaptive-offset-processed image information 744a on the basis of the deblocking filter processed image information 742a. For example, the sample adaptive offset processed video information 744a may be designated with $y_2$.

For example, the deblocking filtering (DBF) 742 and the sample adaptive offset (SAO) processing 744 may be considered (together) as a first denoising operation.

Moreover, the processing path 740 also comprises an adaptive loop filtering (ALF) 746 which may, for example, relieve the sample adaptive offset processed image information 744a and provide, on the basis thereof, an adaptive loop filtered image information. The adaptive loop filtered image information may, for example, constitute the video output 712.

However, optionally, the processing path 740 further comprises a post sample adaptive offset (PSAO) processing 760, which receives an image information provided by the adaptive loop filtering (ALF) 746 (e.g., an adaptive loop filtered image information) and provide, on the basis thereof, a reconstructed image information 762, which may, for example, take the place of the video output information 712. In other words, in the absence of the post sample adaptive offset (PSAO) processing 760, the video output information 712 may be the output of the adaptive loop filtering (ALF) 746, but in the presence of the (optional) post sample adaptive offset (PSAO) processing 760, the video output information 712 may actually be provided by the post sample adaptive offset (PSAO) process 760. Worded differently, the reconstructed image information 762 may be equal to the output of the adaptive loop filtering (ALF) 746 in the absence of the post sample adaptive offset (PSAO) processing 760, but the reconstructed video information 762 may be equal to the output of the post sample adaptive offset (PSAO) processing 760 (or may be based on the output of the post sample adaptive offset (PSAO) processing 760) in the presence of the post sample adaptive offset (PSAO) processing 760.

Moreover, it should be noted that the deblocking filter (DBF) 742 may correspond to the deblocking filter (DBF) 646, that the sample adaptive offset (SAO) processing 742 may correspond to the sample adaptive offset (SAO) processing 648, that the adaptive loop filtering (ALF) 746 may correspond to the adaptive loop filtering (ALF) 649 and that the post sample adaptive offset (PSAO) processing 760 may correspond to the post sample adaptive offset (PSAO) processing 660. Worded differently, the processing path 740 may comprise the same functionality as provided by the corresponding components of the video encoder 600. Accordingly, the above explanations put forward with respect to the video encoder 600 as described in section 6 may also apply in a corresponding manner.

Furthermore, it should be noted that the video decoder 700 also comprises a prediction 750, which corresponds to the prediction 650. For example, the prediction 750 comprises a picture buffering 754, which receives the reconstructed image information 762 (provided by the adaptive loop filtering (ALF) 746 or by the post sample adaptive offset (PSAO) 760) and provides a buffered image information 754a. Moreover, the prediction 750 comprises a motion compensation 756, which receives the buffered image information 754a and provides a motion compensated image information 756a (for example, using additional information with respect to motion vectors, which is included, in an encoded form, in the bitstream 710). Moreover, the prediction 750 comprises an intra prediction 752, which typically receives the partially decoded image information 736 (also designated with $y_1$) and performs an intra prediction (e.g., a prediction within a block or frame, typically using prediction information included, in an encoded form, in the bitstream 710). For example, the intra prediction 752 performs a prediction on the basis of image information from the same frame, while the motion compensation 756 performs a prediction on the basis of image information from one or more previous frames or even from one or more subsequent frames.

Moreover, the prediction 750 comprises an intra/inter mode selection 758, which decides (for example) based on a signaling input, in an encoded form, in the bitstream 710) where the intra-prediction or an inter-prediction, or a combination of both, should be used. The intra/inter mode selection 758 provides the prediction result 738, which is then added to the partial reconstructed image information 732 provided by the inverse quantization and inverse transform 730.

To conclude, the video decoder 700 comprises a processing path or denoising path or post processing pass 740, in which a plurality of denoising operations are performed. For example, the deblocking filtering (DBF) 742 and the sample adaptive offset (SAO) operation 744 may be considered as a first denoising operation, and the adaptive loop filtering (ALF) 746 and the post sample adaptive offset (PSAO) operation 760 may be considered as a second denoising operation. For example, the post sample adaptive offset (PSAO) operation 760 may be adapted in dependence on a difference between samples (or sample values) before and after the first denoising operation. For example, as described in section 6.3, a classification that is used in the post sample adaptive offset (PSAO) operation 760, is based on a difference between the image information $y_2$ (e.g., sample values thereof) and the information $y_1$ (e.g., sample values thereof). In other words, the post sample adaptive offset (PSAO) 760 may use a classification as described in section 6.3, wherein the classification may, for example, be performed in accordance with equation (6). Moreover, the actual functionality of the post sample adaptive offset (PSAO) processing 760 may correspond to the functionality described by equation (1) in section 6.2, wherein pixel values provided by the adaptive loop filter (ALF) 746 may take the place of the sample value y mentioned in equation (1), and wherein a result value y mentioned in equation (1) may take the role of the reconstructed image information or reconstructed video output 712, 762.

Moreover, it should be noted that the functionality of blocks 742, 744, 746, 760 may correspond to the functionality of blocks 646, 648, 649, 660, wherein, for example, parameters used by the PSAO 760 may be determined in the video encoder 600, e.g., using equation (3), encoded in the bitstream by the entropy coding 630 and decoded by the entropy coding 720 and provided to the decoder sided PSAO 760 by the entropy decoding 720.

Moreover, it should be noted that the video decoder 700 may optionally be supplemented by any of the features, functionalities and the details disclosed herein, both individual and taken in combination.

FIG. 8 shows a graphic representation of some samples of N(i). For example, a four-neighborhood (e.g. of a sample value at sample position (x, y)) is shown at a reference numeral 810 and an eight-neighborhood of a (central) sample value at sample position (x, y) is shown at reference numeral 820. For example, sample values at the five sample positions reference numeral 810 may be used for the calculation of f(i), wherein same or different weights may be applied to different sample positions.

Similarly, sample values at the nine positions shown at reference numeral 820 may optionally be used for the evaluation of the function f(i), wherein same or different weights may be applied to sample values at the different sample positions shown at reference numeral 820.

Moreover, FIG. 9 shows a schematic representation of examples of a local neighborhood N((i1, i2)) containing five samples (as shown at reference numeral 910) and nine samples (as shown at reference numeral 920). For example, the local neighborhood 910 may be similar to the local neighborhood 810, and the local neighborhood 920 may be similar to the local neighborhood 820, wherein a sample value at the central position may also be considered.

10. Embodiment According to FIG. 10

FIG. 10 shows a block schematic diagram of a video encoder according to another embodiment of the present invention.

FIG. 10 shows a block diagram of an encoder, according to an embodiment of the invention. It should be noted that, in the encoder block diagram of FIG. 10, unfiltered and filtered images are designated with $Y_1$ and Y.

It should be noted that the encoder 1000 according to FIG. 10 may, for example, be similar to the encoder 600 according to FIG. 6, such that identical components will not be explained here again. Rather, it should be noted that the transform and quantization 1020 corresponds to a transform and quantization 620, that the entropy coding 1030 corresponds to the entropy coding 630, that the inverse quantization inverse transform 1044 corresponds to the inverse quantization inverse transform 644, that the intra prediction 1052 corresponds to the intra prediction 652, that the picture buffering 1054 corresponds to the picture buffering 654, that the motion compensation 1056 corresponds to the motion compensation 656 and that the intra/inter mode selection 1058 corresponds to the intra/inter mode selection 658. However, it should be noted that the reconstruction path 1040 in its entirety differs from the reconstruction path 640. While the inverse quantization and inverse transform 1044 corresponds to the inverse quantization and inverse transform 644 and the prediction addition 1045 corresponds to the prediction addition 645, there is a difference in the in-loop filtering operations. For example, the deblocking filter (DBF) 646 is replaced by separate vertical and horizontal deblocking filters (DBFV and DBFH) 1046, 1047. For example, the vertical deblocking filter (DBFV) 1046 receives the partially reconstructed image information 1044c (which may correspond to the image information 644c, which may also be designated with $Y_1$) and performs a deblocking filtering in a vertical direction. Moreover, the horizontal deblocking filter (DBFH) 1047 performs a deblocking filtering in a horizontal direction on the basis of a result of the vertical deblocking filter (DBFV) 1046. However, it should be noted that the horizontal and vertical deblocking filters (DBFV and DBFH) might also be exchanged in their processing order. Accordingly, after application of both the vertical deblocking filtering and the horizontal deblocking filtering (for example, by blocks 1046, 1047), a deblocking image information 1047a is obtained, which corresponds to the image information 646a and which is also designated with Y. Moreover, the denoising path or post processing path 1040 further comprises a sample adaptive offset (SAO) processing and an adaptive loop filter (ALF) processing, which is designated with reference numeral 1049, and which may, for example, correspond to the adaptive loop filtering (ALF) 649 and the post sample adaptive offset (PSAO) processing 660. For example, the sample adaptive offset (SAO) and an adaptive loop filter (ALF) processing 1049 may comprise a classification, for example as defined by equation (4)', which may be based on the basis of the image information Y and $Y_1$ as shown in FIG. 10.

For further details, reference is made, for example, to section 7.3.1.2.

Moreover, the variation of $\hat{Y}$ may, for example, be performed according to equation (5)' by the SAO processing of block 1049 (wherein, for example, the adaptive loop filtering (ALF), which is also part of processing block 1049, may then operate on the image information Y').

Moreover, it should be noted that further details may, for example, be seen in section 7 of the description.

However, it should be noted that the video encoder 1000 according to FIG. 10 may optionally be supplemented by any of the features, functionalities and details disclosed herein, both individual and taken in combination.

11. Embodiment According to FIG. 11

Figure 11:
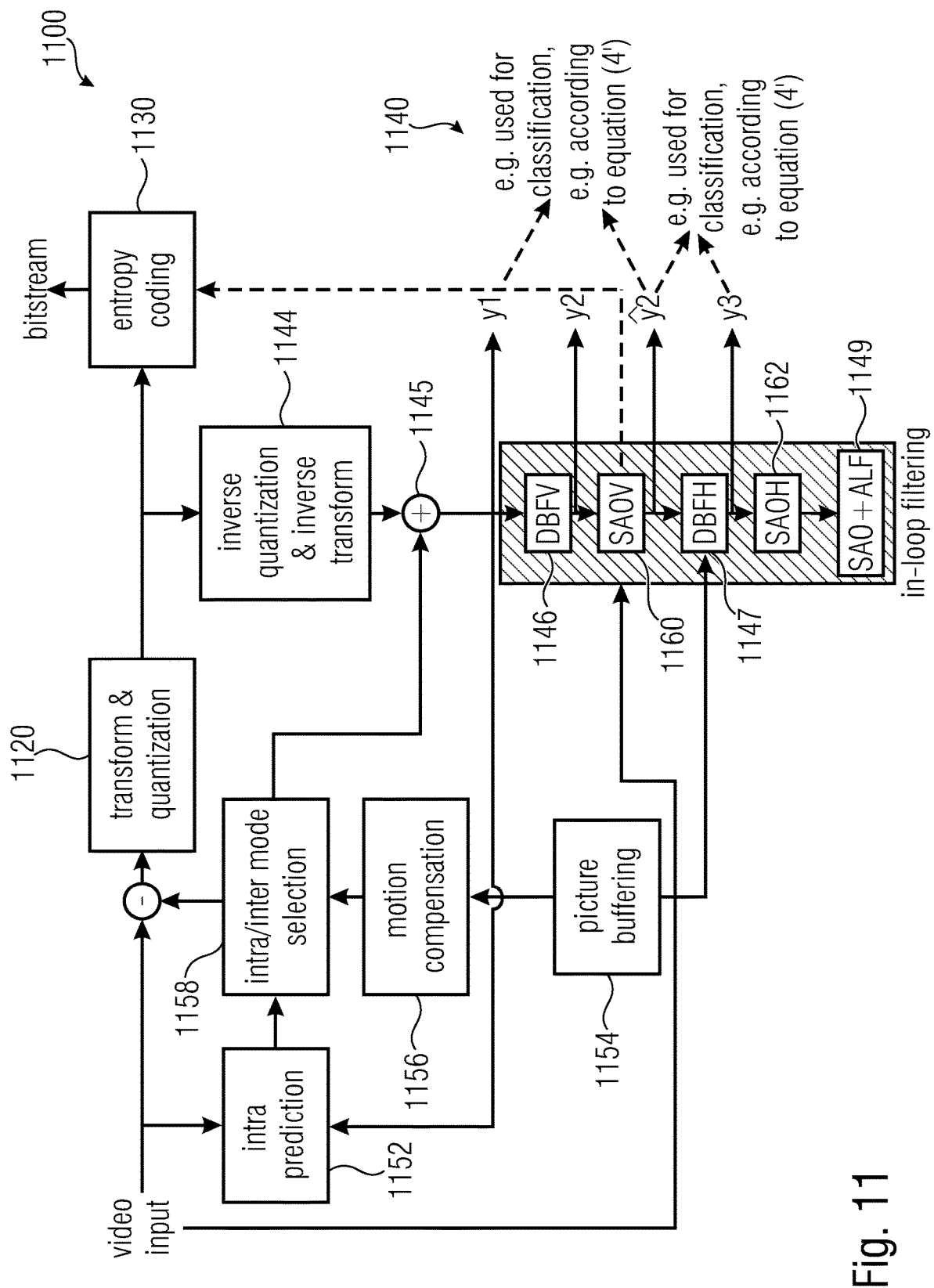
FIG. 11 shows a block diagram of an encoder where the SAODBF operation is used as a second denoising operation in accordance with an embodiment.

FIG. 11 shows a block diagram of an encoder or video encoder, according to an embodiment of the present invention. The video encoder is designated in its entirety with 1100. Moreover, it should be noted that there are, for example, unfiltered and filtered images, which are designated with $Y_1$, $Y_2$, $\hat{Y}_2$ and $Y_3$ (which may, for example, be represented by image information or by sample values).

Moreover, it should be noted that the video encoder 1100 is very similar to the video encoder 1000 such that identical blocks and functionalities will not be described here again. In particular, blocks 1120, 1130, 1144, 1145, 1154, 1156, 1152 and 1158 correspond to blocks 1020, 1030, 1044, 1045, 1054, 1052, 1056 and 1058, respectively. In particular, explanations provided with respect to the corresponding blocks regarding the video encoder 600 also apply.

However, the processing path or post processing path or denoising path 1140 differs from the corresponding functionality in the video encoder 600, 1000. For example, the denoising path 1140 comprises a sequence of processing blocks or processing functionalities, namely a vertical deblocking filter (DBFV) 1146, a vertical sample adaptive offset (SAOV) processing 1160, a horizontal deblocking filter (DBFH) 1147, horizontal sample adaptive offset (SAOH) processing 1162 and a further sample adaptive offset and adaptive loop filtering (SAO+ALF) 1149. In other words, there is a vertical denoising functionality, which comprises operations 1146 and 1160 and a horizontal denoising functionality, which comprises blocks 1147 and 1162, and there is, in addition, a further sample adaptive offset processing and a further adaptive loop filtering (block 1149). In this respect, it should be noted that the order of the vertical denoising 1146, 1160 and of the horizontal denoising 1147, 1162 may optionally be exchanged, and that the "final" processing block 1149 may be considered as being optional. Moreover, it should be noted that, in some embodiments, only one of the vertical denoising 1146, 1160 and the horizontal denoising 1147, 1162 could be applied.

Moreover, it should be noted that any functionality of blocks 1160, 1162 may, for example, be performed as described in section 7.3.2. For example, the vertical sample adaptive offset (SAOV) processing 1162 may perform a classification (e.g., in accordance with equation (4)') on the basis of a difference between image information Y2 and Y1 and using a processing as defined, for example, by equation (5)', wherein Y2 takes the place of Y and wherein Y2 takes the place of $\hat{Y}$. Similarly, the horizontal sample adaptive offset processing 1162 may perform a classification in accordance with equation (4)' on the basis of a difference between $Y_3$ and $\hat{Y}_2$. The horizontal sample adaptive offset processing 1162 may, for example, perform a processing in accordance with equation (5)', wherein $Y_3$ may take the role of Y and wherein an output signal of the horizontal sample adaptive offset processing 1162 may be given by $\hat{Y}$ of equation (5)'.

To conclude, the video encoder 1100 may, for example, perform a processing as described in section 7.3.2.

Moreover, it should be noted that the video encoder 1100 according to FIG. 11 may optionally be supplemented by any of the features, functionalities and details disclosed herein, both individual and taken in combination.

Moreover, it should be noted that blocks 1046, 1047, 1049 may, for example, take the place of blocks 742, 744, 746, 760 in the video decoder 700, wherein an output image information of block 1049, may, for example, form the video output 712 and the reconstructed image information 762.

Similarly, blocks 1146, 1160, 1147, 1162, 1149 may optionally take the place of blocks 742, 744, 746, 760, wherein an output of block 1149 may, for example, take the place of the video output 712 and of the reconstructed image information 762.

12. Conclusions

To conclude, embodiments according to the invention provide an improved tradeoff between a compression performance and a visual quality and a low encoding latency, which leads to an improved coding efficiency. Some embodiments also provide an additional coding efficiency.

Different inventive embodiments and aspects are described, for example, in the chapters "Introduction", "Sample Adaptive Offset", "Classification for PSAO", "Decoder", "Encoder" and "Some Comments", wherein features, functionalities and details from the chapter "Sample Adaptive Offset" may optionally be introduced into any of the other embodiments.

However, the features, functionalities and details described in any other chapters can also, optionally, be introduced into the embodiments according to the present invention.

Also, the embodiments described in the above mentioned chapters can be used individually, and can also be supplemented by any of the features, functionalities and details in another chapter.

Also, it should be noted that individual aspects described herein can be used individually or in combination. Thus, details can be added to each of said individual aspects without adding details to another one of said aspects.

In particular, embodiments are also described in the claims. The embodiments described in the claims can optionally be supplemented by any of the features, functionalities and details as described herein, both individually and in combination.

It should also be noted that the present disclosure describes, explicitly or implicitly, features usable in a video encoder (apparatus for providing an encoded representation of an input video signal) and in a video decoder (apparatus for providing a decoded representation of a video signal on the basis of an encoded representation of a video signal). Thus, any of the features described herein can be used in the context of a video encoder and in the context of a video decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Implementation Alternatives

Although some aspects are described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A video decoder for providing a decoded video information $VI_{de}$ on a basis of an encoded video information $VI_{en}$;
    wherein the video decoder is configured to acquire first sample information $I_{s1}$ on the basis of the encoded video information $VI_{en}$;
    wherein the video decoder is configured to apply a first denoising operation, in order to acquire a first denoised sample information $I_{ds1}$ on a basis of the first sample information $I_{s1}$;
    wherein the video decoder is configured to apply a second denoising operation on a basis of a result of the first denoising operation; and
    wherein the video decoder is configured to adjust the second denoising operation in dependence on differences between samples before the first denoising operation and after the first denoising operation, in order to acquire the decoded video information $VI_{de}$.

2. The video decoder according to claim 1,
    wherein the second denoising operation is configured to classify the samples into a plurality of classes of samples in dependence on the differences between the samples before the first denoising operation and after the first denoising operation, and
    wherein the second denoising operation is configured to modify the samples in dependence on the classification.

3. The video decoder according to claim 1,
    wherein the second denoising operation is configured to conditionally add an offset to a at least two of the samples in dependence on a classification of the respective samples.

4. The video decoder according to claim 1,
    wherein the first denoising operation comprises a deblocking filter operation and/or a sample-adaptive offset filter operation.

5. The video decoder according to claim 4,
    wherein the samples are image samples, and
    wherein the sample-adaptive offset filter operation is configured to classify the image samples into a plurality of classes in dependence on one or more edge patterns in the image in an environment of a sample of the image samples under consideration and/or in dependence on a sample value of the sample of the image samples under consideration.

6. The video decoder according to claim 1,
    wherein the first denoising operation comprises an adaptive loop filter (ALF) operation which performs a filtering using an impulse response, coefficients of which are encoded in the bitstream.

7. The video decoder according to claim 1,
    wherein the video decoder is configured to apply the second denoising operation to a sample information which is acquired using a combination of one or more deblocking filter operations, one or more sample-adaptive offset filtering operations and an adaptive loop filter operation.

8. The video decoder according to claim 1,
    wherein the second denoising operation is configured to be applied to a number of Coding Tree Units (CTU)s which define a video frame, and/or
    wherein the second denoising operation is configured to be applied to a video frame comprising Coding Tree Units which define the video frame.

9. The video decoder according to claim 2,
wherein the classification of the samples into the plurality of classes only occurs when one or more of predetermined threshold values is reached.

10. The video decoder according to claim 1,
wherein the second denoising operation is configured to classify the samples into three or more classes in dependence on whether the differences between the samples before the first denoising operation and after the first denoising operation fulfill a first condition or a second condition or a third condition,
or in dependence on whether a combined difference value, which is based on the differences between the samples before the first denoising operation and after the first denoising operation, fulfills the first condition or the second condition or the third condition.

11. The video decoder according to claim 1,
wherein the second denoising operation is configured to classify the samples into three or more classes in dependence on a magnitude of the differences between samples before the first denoising operation and after the first denoising operation and in dependence on a sign of the differences between the samples before the first denoising operation and after the first denoising operation.

12. The video decoder according to claim 1,
wherein the second denoising operation is configured to classify the samples into three classes according to $$\Lambda_1 = \{i \in I : (y_2(i) - y_1(i)) > T\}$$

and $$\Lambda_2 = \{i \in I : (y_2(i) - y_1(i)) < -T\}$$

$$\Lambda_0 = I \cap (\Lambda_1 \cup \Lambda_2)^c$$

wherein lambda1 ($\Lambda_1$) is a set of samples associated with a first class,
wherein lambda2 ($\Lambda_2$) is a set of samples associated with a second class,
wherein lambda0 ($\Lambda_0$) is a set of samples associated with a third class,
wherein T is a predetermined value;
wherein I is a basic set of samples;
wherein $\cap$ is a cutting set operator—intersection;
wherein $\cup$ is a merge set operator—union; and
wherein $^c$ is a complementary set operator.

13. The video decoder according to claim 1,
wherein the second denoising operation is configured to determine a combination of weighted differences, which combines a plurality of differences between the samples before the first denoising operation and after the first denoising operation in a predetermined environment of a currently considered sample of the samples before the first denoising operation and after the first denoising operation, in order to acquire the combined difference value associated with the currently considered sample.

14. The video decoder according to claim 13,
wherein the second denoising operation is configured to determine the combined difference value f(i) according to $$f(i) = \sum_{j \in N(i)} w(i-j) \cdot (y_2(j) - y_1(j))$$

wherein j is a sample index,
wherein N(i) is a set of samples to be considered for the determination of the combined difference value associated with a sample under consideration comprising a sample index i;
wherein w(i−j) is a set of predetermined weight values associated with a plurality of sample locations in the environment of the sample under consideration; and
wherein $y_2(j) - y_1(j)$ is a difference between corresponding samples before the first denoising operation and after the first denoising operation.

15. The video decoder according to claim 2,
wherein the second denoising operation is configured to select a quantized offset value in dependence on the classification.

16. The video decoder according to claim 2,
wherein the second denoising operation is configured to select an offset value using one or more offset values encoded in the encoded video information $VI_{en}$.

17. The video decoder according to claim 1,
wherein the second denoising operation is configured to yield an enhanced sample value ŷ according to $$\hat{y} = \sum_{\ell=0}^{2} \chi \Lambda_\ell \cdot (y + Q(d_\ell))$$

wherein $d_l$ is an offset value corresponding to a class;
wherein l is a class index;
wherein Q is a quantization-function;
wherein y is a sample value input into the second denoising operation; and
wherein $\chi \Lambda_l$ is an indicator function indicating in which class l a currently considered sample y is classified.

18. The video decoder according to claim 17,
wherein the indicator function $\chi \Lambda_l$ is defined by $$\chi \Lambda_\ell (i) = \begin{cases} 1 & i \in \Lambda_\ell \\ 0 & i \notin \Lambda_\ell \end{cases}$$

and $$\Lambda_\ell = \{i \in I : C(i) = \ell\}.$$

lambda $\Lambda_l$ is a class;
wherein l is a class index for each sample location i in the basic set of samples I;
wherein i is a sample location in the basic set of samples I;
wherein C is a classification for the sample location i;
wherein $\in$ is a member-of-set operator; and
wherein $\notin$ is a not-member-of-set operator.

19. The video decoder according to claim 1,
wherein the second denoising operation is configured to use a first offset value for all samples of a video frame classified into a first class, and/or
wherein the second denoising operation is configured to use a second offset value for all samples of a video frame classified into a second class, and/or
wherein the second denoising operation is configured to use a third offset value for all samples of a video frame classified into a third class.

20. The video decoder according to claim 1,
wherein the video decoder is configured to evaluate a bitstream flag to decide whether the second denoising operation is performed or not.

21. The video decoder according to claim 1,
wherein the video decoder is configured to apply the second denoising operation independently to different YUV components.

22. The video decoder according to claim 1,
wherein the second denoising operation is configured to classify the samples into a plurality of classes according to:

$$\Lambda_\ell = \{i \in I : T_{\ell-1} \leq (Y_1(i) - Y(i)) < T_\ell\}$$

and $$\Lambda_{\ell+L} = \{i \in I : T_{\ell-1} \leq (Y(i) - Y_1(i)) < T_\ell\}$$

for $\ell = 1, \ldots, L$ and $$\Lambda_0 = I \cap (\Lambda_1 \cup \cdots \cup \Lambda_{2L})^c$$

wherein lambda $\Lambda_l$ is a set of samples associated with a class $1, \ldots, 2L$;
wherein lambda $\Lambda_0$ is a set of samples associated with a class excluding class(es) $1, \ldots, 2L$;
wherein $T_{l-1}$ to $T_l$ are predetermined values;
wherein I is a basic set of samples;
wherein $\cap$ is a cutting set operator—intersection;
wherein $\cup$ is a merge set operator—union; and
wherein $^c$ is a complementary set operator.

23. The video decoder according to claim 1, wherein $T_{l-1}$ to $T_l$ are symmetrical class boundaries for the differences between the samples before the first denoising operation and after the first denoising operation, in order to acquire a classification for the individual samples.

24. The video decoder according to claim 2,
wherein the second denoising operation is configured to select a quantized offset value in dependence on the classification.

25. The video decoder according to claim 2,
wherein the second denoising operation is configured to select an offset value using offset values encoded in the encoded video information $VI_{en}$.

26. The video decoder according to claim 1,
wherein the second denoising operation is configured to yield an enhanced sample value $\hat{Y}$ according to $$\hat{Y} = \sum_{\ell=0}^{2L} \chi\Lambda_l \cdot (Y + Q(d_\ell))$$

wherein $d_l$ is an offset value corresponding to a class;
wherein 1 is a class index;
wherein Q is a quantization-function;
wherein Y is a sample value input into the second denoising operation; and
wherein $\chi\Lambda_l$ is an indicator function indicating in which class 1 a currently considered sample Y is classified.

27. The video decoder according to claim 26,
wherein the indicator function $\chi\Lambda_l$ is defined by $$\chi\Lambda_\ell(i) = \begin{cases} 1 & i \in \Lambda_\ell \\ 0 & i \notin \Lambda_\ell \end{cases}$$

and $$\Lambda_\ell = \{i \in I : C(i) = \ell\}.$$

lambda $\Lambda_l$ is a class;
wherein 1 is a class index for each sample location i in the basic set of samples I;
wherein i is a sample location in the basic set of samples I;
wherein C is a classification for the sample location i;
wherein $\in$ is a member-of-set operator; and
wherein $\notin$ is a not-member-of-set operator.

28. The video decoder according to claim 1,
wherein the second denoising operation is configured to use a first to 2Lth offset value for all samples of a video frame or a Coding Tree Unit (CTU) classified into the respective classes, and/or
wherein the second denoising operation is configured to use an offset value for all samples of a video frame classified in a class which is complementary to I.

29. The video decoder according to claim 1,
wherein the video decoder is configured to evaluate a bitstream flag to decide whether the second denoising operation is performed or not.

30. The video decoder according to claim 1,
wherein the video decoder is configured to apply the second denoising operation independently to different YUV components.

31. The video decoder according to claim 1,
wherein the second denoising operation uses a same parameter set for the processing of a frame or each CTU.

32. The video decoder according to claim 1,
wherein the first denoising operation is a deblocking filter operation in a first direction, and wherein the second denoising operation is a first sample-adaptive-offset operation.

33. The video decoder according to claim 32,
wherein the video decoder is configured to apply a third denoising operation, which is deblocking filter operation in a second direction using a result of the second denoising operation, and
wherein the video decoder is configured to apply a fourth denoising operation on a basis of a result of the third denoising operation.

34. The video decoder according to claim 33,
wherein the second denoising operation and the fourth denoising operation use different parameters or parameter sets for the processing of a frame.

35. The video decoder according to claim 34,
wherein the video decoder is configured to apply a fifth denoising operation, based on a result of the fourth denoising operation.

36. The video decoder according to claim 34,
wherein the fifth denoising operation uses different parameters or parameter sets.

37. A video encoder for providing an encoded video information $VI_{en}$ on a basis of an input video information VI,
wherein the video encoder is configured to acquire first sample information $I_{s1}$, which considers a transform into a spectral domain, a quantization of transform coefficients and a prediction, on a basis of the input video information VI, wherein the video encoder is configured to apply a first denoising operation, in order to acquire a first denoised sample information $I_{ds1}$ on a basis of the first sample information $I_{s1}$;

wherein the video encoder is configured to determine parameters of a second denoising operation on a basis of a result of the first denoising operation; and wherein the video encoder is configured to adjust the second denoising operation in dependence on differences between samples before the first denoising operation and after the first denoising operation, in order to acquire the encoded video information $VI_{en}$.

38. The video encoder according to claim 37,
wherein the second denoising operation is configured to classify the samples into a plurality of classes of samples in dependence on the differences between the samples before the first denoising operation and after the first denoising operation, and wherein the video encoder is configured to determine parameters of the second denoising operation in dependence on the classification.

39. The video encoder according to claim 37,
wherein the second denoising operation is configured to conditionally add an offset to at least two of the samples in dependence on a classification of the respective samples.

40. The video encoder according to claim 37,
wherein the first denoising operation comprises a deblocking filter and/or a sample-adaptive offset filter operation.

41. The video encoder according to claim 40,
wherein the samples are image samples, and
wherein the sample-adaptive offset filter operation is configured to classify the image samples of an image into a plurality of classes in dependence on one or more edge patterns in the image in an environment of a sample of the image samples under consideration and/or independence on a sample value of the sample of the image samples under consideration.

42. The video encoder according to claim 37,
wherein the first denoising operation comprises an adaptive loop filter (ALF) operation which performs a filtering using an impulse response, coefficients of which are encoded in the bitstream.

43. The video encoder according to claim 37,
wherein the video encoder is configured to apply the second denoising operation to a sample information which is acquired using a combination of one or more deblocking filter operation, one or more sample-adaptive offset filtering operations and an adaptive loop filter operation.

44. The video encoder according to claim 37,
wherein the second denoising operation is configured to be applied to a number of Coding tree units (CTU)s which define a video frame, and/or
wherein the second denoising operation is configured to be applied to a video frame comprising Coding Tree Units which define the video frame, and
wherein the classification of the samples into a plurality of classes only occurs when a predetermined threshold value is reached.

45. The video encoder according to claim 37,
wherein the second denoising operation is configured to classify the samples into three or more classes in dependence on whether the differences between the samples before the first denoising operation and after the first denoising operation fulfill a first condition or a second condition or a third condition,
or in dependence on whether a combined difference value, which is based on the differences between the samples before the first denoising operation and after the first denoising operation, fulfils a first condition or a second condition or a third condition.

46. The video encoder according to claim 37,
wherein the second denoising operation is configured to classify the samples into three or more classes in dependence on a magnitude of the differences between the samples before the first denoising operation and after the first denoising operation and in dependence on a sign of the differences between the samples before the first denoising operation and after the first denoising operation.

47. The video encoder according to claim 37,
wherein the second denoising operation is configured to classify the samples into three classes according to $$\Lambda_1 = \{i \in I : (y_2(i) - y_1(i)) > T\} \text{ and } \Lambda_2 = \{i \in I : (y_2(i) - y_1(i)) < -T\}$$

$$\Lambda_0 = I \cap (\Lambda_1 \cup \Lambda_2)^c$$

wherein lambda1 ($\Lambda_1$) is a set of samples associated with a first class,
wherein lambda2 ($\Lambda_2$) is a set of samples associated with a second class,
wherein lambda0 ($\Lambda_0$) is a set of samples associated with a third class,
wherein T is a predetermined value;
wherein I is a basic set of samples;
wherein $\cap$ is a cutting set operator—intersection;
wherein $\cup$ is a merge set operator—union; and
wherein $^c$ is a complementary set operator.

48. The video encoder according to claim 37,
wherein the second denoising operation is configured to determine a combination of weighted differences, which combines a plurality of differences between the samples before the first denoising operation and after the first denoising operation in a predetermined environment of a currently considered sample of the samples before the first denoising operation and after the first denoising operation, in order to acquire the combined difference value associated with the currently considered sample;
wherein the second denoising operation is configured to determine the combined difference value f(i) according to $$f(i) = \sum_{j \in N(i)} w(i - j) \cdot (y_2(j) - y_1(j))$$

wherein j is a sample index,
wherein N(i) is a set of samples to be considered for the determination of the combined difference value associated with a sample under consideration comprising a sample index i;
wherein w(i−j) is a set of predetermined weight values associated with a plurality of sample locations in the environment of the sample under consideration; and
wherein $y_2(j) - y_1(j)$ is a difference between corresponding samples before the first denoising operation and after the first denoising operation.

49. The video encoder according to claim 37,
wherein the second denoising operation is configured to select a quantized offset value in dependence on the classification.

50. The video encoder according to claim 37, wherein the second denoising operation is configured to select an offset value using one or more offset values encoded in the encoded video information $VI_{en}$.

51. The video encoder according to claim 37,
wherein the second denoising operation is configured to yield an enhanced sample value $\hat{y}$ according to $$\hat{y} = \sum_{\ell=0}^{2} \chi_{\Lambda_\ell} \cdot (y + Q(d_\ell))$$

wherein $d_l$ is an offset value corresponding to a class;
wherein 1 is a class index;
wherein Q is a quantization-function;
wherein y is a sample value input into the second denoising operation; and
wherein $\chi \Lambda_l$ is an indicator function indicating in which class 1 a currently considered sample y is classified.

52. The video encoder according to claim 51,
wherein the indicator function $\chi \Lambda_l$ is defined by $$\chi_{\Lambda_\ell}(i) = \begin{cases} 1 & i \in \Lambda_\ell \\ 0 & i \notin \Lambda_\ell \end{cases} \text{ and } \Lambda_\ell = \{i \in I : C(i) = \ell\}.$$

wherein lambda $\Lambda_l$ is a class;
wherein 1 is a class index for each sample location i in the basic set of samples I;
wherein i is a sample location in the basic set of samples I;
wherein C is a classification for the sample location i;
wherein $\in$ is a member-of-set operator; and
wherein $\notin$ is a not-member-of-set operator.

53. The video encoder according to claim 37,
wherein the second denoising operation is configured to use a first offset value for all samples of a video frame classified into a first class, and/or
wherein the second denoising operation is configured to use a second offset value for all samples of a video frame classified into a second class, and/or
wherein the second denoising operation is configured to use a third offset value for all samples of a video frame classified into a third class.

54. The video encoder according to claim 37,
wherein the video encoder is configured to evaluate a bitstream flag to decide whether the second denoising operation is performed or not.

55. The video encoder according to claim 37,
wherein the video encoder is configured to apply the second denoising operation independently to different YUV components.

56. The video encoder according to claim 37,
wherein the video encoder is configured to determine one or more offset values, which are used in the second denoising operation, on a basis of the input video representation and in dependence on a classification of samples performed on a basis of the differences between the samples before the first denoising operation and after the first denoising operation.

57. The video encoder according to claim 37,
wherein the video encoder is configured to determine an offset value ($d_l$) associated with a set of samples classified into a given class in dependence on a deviation between input samples of the second denoising classified into the given class and corresponding samples of the input video information VI.

58. The video encoder according to claim 57,
wherein the video encoder is configured to determine an offset value ($d_l$) associated with a set of samples classified into a given class, such that a mean square error between input samples of the second denoising classified into the given class and corresponding samples of the input video information VI is minimized or is brought below a predetermined threshold.

59. The video encoder according to claim 57,
wherein the video encoder is configured to determine an offset value $d_l$ associated with a set of samples classified into a given class comprising a class index 1 according to $$d_\ell = \frac{1}{\#(\Lambda_\ell)} \sum_{i \in \Lambda_\ell} (x(i) - y(i))$$

wherein $\#(\Lambda_l)$ is a number of samples classified into a class comprising class index 1;
wherein $\Lambda_l$ is a set of samples classified into the class comprising class index 1;
wherein i is a sample index;
wherein x(i) are sample values of the input video information VI; and
wherein y(i) are sample values input into the second denoising operation.

60. The video encoder according to claim 37,
wherein the second denoising operation is configured to classify the samples into a plurality of classes according to:

$$\Lambda_\ell = \{i \in I : T_{\ell-1} \leq (Y_1(i) - Y(i)) < T_\ell\}$$

and $$\Lambda_{\ell+L} = \{i \in I : T_{\ell-1} \leq (Y(i) - Y_1(i)) < T_\ell\}$$

for $\ell = 1, \ldots, L$ and $$\Lambda_0 = I \cap (\Lambda_1 \cup \cdots \cup \Lambda_{2L})^c$$

wherein lambda $\Lambda_l$ is a set of samples associated with a class 1, . . . , 2L;
wherein lambda0 ($\Lambda_0$) is a set of samples associated with a class excluding class(es) 1, . . . , 2L;
wherein $T_{l-1}$ to $T_l$ are predetermined values;
wherein I is a basic set of samples;
wherein $\cap$ is a cutting set operator—intersection;
wherein $\cup$ is a merge set operator—union; and
wherein $^c$ is a complementary set operator.

61. The video encoder according to claim 37, wherein $T_{l-1}$ to $T_l$ are symmetrical class boundaries for the differences between the samples before the first denoising operation and after the first denoising operation, in order to acquire a classification for the individual samples.

62. The video encoder according to claim 37,
wherein the second denoising operation is configured to select a quantized offset value in dependence on the classification, and
wherein the second denoising operation is configured to select the offset value using offset values encoded in the encoded video information $VI_{en}$.

63. The video encoder according to claim 37,
wherein the second denoising operation is configured to yield an enhanced sample value $\hat{Y}$ according to $$\hat{Y} = \sum_{\ell=0}^{2L} \chi_{\Lambda_\ell} \cdot (Y + Q(d_\ell))$$

wherein $d_l$ is an offset value corresponding to a class;
wherein l is a class index;
wherein Q is a quantization-function;
wherein Y is a sample value input into the second denoising operation; and
wherein $\chi\Lambda_l$ is an indicator function indicating in which class l a currently considered sample Y is classified.

64. The video encoder according to claim 63,
wherein the indicator function $\chi\Lambda_l$ is defined by $$\chi_{\Lambda_\ell}(i) = \begin{cases} 1 & i \in \Lambda_\ell \\ 0 & i \notin \Lambda_\ell \end{cases} \text{ and } \Lambda_\ell = \{i \in I : C(i) = \ell\}.$$

lambda $\Lambda_l$ is a class;
wherein l is a class index for each sample location i in the basic set of samples I;
wherein i is a sample location in the basic set of samples I;
wherein C is a classification for the sample location i;
wherein ∈ is a member-of-set operator; and
wherein ∉ is a not-member-of-set operator.

65. The video encoder according to claim 37,
wherein the second denoising operation is configured to use a first to 2Lth offset value for all samples of a video frame or a Coding Tree Unit (CTU) classified into the respective classes, and/or
wherein the second denoising operation is configured to use an offset value for all samples of a video frame classified in a class which is complementary to I, and
wherein the video encoder is configured to evaluate a bitstream flag to decide whether the second denoising operation is performed or not.

66. The video encoder according to claim 37,
wherein the video encoder is configured to evaluate a bitstream flag to decide whether the second denoising operation is performed or not.

67. The video encoder according to claim 37,
wherein the video encoder is configured to apply the second denoising operation independently to different YUV components, and
wherein the second denoising operation uses a same parameter set for the processing of a frame or each CTU.

68. The video encoder according to claim 37
wherein the first denoising operation is a deblocking filter operation in a first direction, and wherein the second denoising operation is a first sample-adaptive-offset operation.

69. The video encoder according to claim 68,
wherein the video encoder is configured to apply a third denoising operation, which is deblocking filter operation in a second direction using a result of the second denoising operation,
wherein the video encoder is configured to apply a fourth denoising operation on a basis of a result of the third denoising operation, and
wherein the second denoising operation and fourth denoising operation use different parameters or parameter sets for the processing of a frame.

70. The video encoder according to claim 69,
wherein the video encoder is configured to apply a fifth denoising operation, on a basis of a result of the fourth denoising operation.

71. The video encoder according to claim 69,
wherein the fifth denoising operation uses different parameters or parameter sets.

72. A method for providing a decoded video information on a basis of an encoded video information,
wherein the method comprises acquiring first sample information on the basis of the encoded video information;
wherein the method comprises applying a first denoising operation, in order to acquire a first denoised sample information based on the first sample information;
wherein the method comprises applying a second denoising operation based on a result of the first denoising operation; and
wherein the method comprises adjusting the second denoising operation in dependence on differences between samples before the first denoising operation and after the first denoising operation, in order to acquire the decoded video information.

73. A method for providing an encoded video information on a basis of an input video information,
wherein the method comprises acquiring first sample information, which considers a transform into a spectral domain, a quantization of transform coefficients and a prediction, on a basis of the input video information;
wherein the method comprises applying a first denoising operation, in order to acquire a first denoised sample information based on the first sample information;
wherein the method comprises determining parameters of a second denoising operation based on a result of the first denoising operation; and
wherein the method comprises adjusting the second denoising operation in dependence on differences between samples before the first denoising operation and after the first denoising operation, in order to acquire the decoded video information.

74. A non-transitory digital storage medium having a computer program stored thereon to perform a method for providing a decoded video information on a basis of an encoded video information,
said method comprising acquiring first sample information on the basis of the encoded video information;
said method comprising applying a first denoising operation, in order to acquire a first denoised sample information on a basis of the first sample information;
said method comprising applying a second denoising operation on a basis of a result of the first denoising operation; and
said method comprising adjusting the second denoising operation in dependence on differences between samples before the first denoising operation and after the first denoising operation, in order to acquire the decoded video information, when said computer program is run by a computer.

75. A non-transitory digital storage medium having a computer program stored thereon to perform a method for providing an encoded video information on a basis of an input video information, said method comprising acquiring first sample information, which considers a transform into a spectral domain, a quantization of transform coefficients and a prediction, on the basis of the input video information, said method comprising applying a first denoising operation, in order to acquire a first denoised sample information based on the first sample information;

said method comprising determining parameters of a second denoising operation based on a result of the first denoising operation; and said method comprising adjusting the second denoising operation in dependence on differences between samples before the first denoising operation and after the first denoising operation, in order to acquire the decoded video information, when said computer program is run by a computer.

76. A non-transitory digital storage medium comprising an encoded video representation representing a video content, wherein the encoded video representation comprises:

an encoded representation of transform coefficients; and a plurality of offset values associated with a second denoising operation, which are associated with a plurality of classes of samples in dependence on a difference between samples before a first denoising operation and after the first denoising operation.

77. The non-transitory digital storage medium according to claim 75, wherein the encoded video information further comprises a flag indicating whether the second denoising operation should be performed or not.

* * * * *

UNITED STATES PATENT AND TRADEMARK OFFICE
CERTIFICATE OF CORRECTION

PATENT NO. : 12,069,268 B2
APPLICATION NO. : 17/560781
DATED : August 20, 2024
INVENTOR(S) : Wang-Q Lim et al.

Page 1 of 1

It is certified that error appears in the above-identified patent and that said Letters Patent is hereby corrected as shown below:

In the Claims

Claim number 18, on Column 52, Line number 43:

$$\chi\Lambda_f(i) = \begin{cases} 1 & i \in \Lambda_f \\ 0 & i \in \Lambda_f \end{cases}$$

Should read:

$$\chi\Lambda_f(i) = \begin{cases} 1 & i \in \Lambda_f \\ 0 & i \notin \Lambda_f \end{cases}$$

Signed and Sealed this
Seventh Day of January, 2025

Derrick Brent
*Acting Director of the United States Patent and Trademark Office*